US011303325B2

(12) United States Patent
Ichikawa

(10) Patent No.: US 11,303,325 B2
(45) Date of Patent: Apr. 12, 2022

(54) ELECTRIC POWER TRANSMITTING DEVICE, NON-CONTACT POWER SUPPLY SYSTEM, AND CONTROL METHOD

(71) Applicant: RENESAS ELECTRONICS CORPORATION, Tokyo (JP)

(72) Inventor: Katsuei Ichikawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 478 days.

(21) Appl. No.: 16/197,976

(22) Filed: Nov. 21, 2018

(65) Prior Publication Data

US 2019/0097686 A1    Mar. 28, 2019

Related U.S. Application Data

(62) Division of application No. 14/313,617, filed on Jun. 24, 2014, now Pat. No. 10,177,817.

(30) Foreign Application Priority Data

Jun. 25, 2013 (JP) .............................. JP2013-132529

(51) Int. Cl.
*H04B 5/00* (2006.01)
*H02J 50/60* (2016.01)
(Continued)

(52) U.S. Cl.
CPC ............ *H04B 5/0037* (2013.01); *H02J 7/025* (2013.01); *H02J 50/12* (2016.02); *H02J 50/50* (2016.02);
(Continued)

(58) Field of Classification Search
CPC ..... H04B 5/0037; H04B 5/0087; H02J 50/50; H02J 17/00; H02J 50/12; H02J 7/025; H02J 50/502
(Continued)

(56) References Cited

U.S. PATENT DOCUMENTS 7,103,328 B2    9/2006 Zelley
7,868,614 B2    1/2011 Bito et al.
(Continued)

FOREIGN PATENT DOCUMENTS

CN    102122848 A    7/2011
JP    2011-151989 A    8/2011
(Continued)

OTHER PUBLICATIONS

Japanese Office Action dated Oct. 27, 2016 issued in Japanese Patent Application No. 2013-132529 (with English translation).
(Continued)

*Primary Examiner* — Hal Kaplan
*Assistant Examiner* — Swarna N Chowdhuri
(74) *Attorney, Agent, or Firm* — McDermott Will & Emery LLP

(57) ABSTRACT

A non-contact power supply system is provided employing an electric power transmitting device which can improve the transmission efficiency of electric power, suppressing the circuit scale. The electric power transmitting device is configured with a resonance circuit including a resonance capacity and a resonance coil acting as a transmitting antenna, and a first coil arranged magnetically coupled with the resonance coil. The electric power transmitting device transmits electric power in a non-contact manner using resonant coupling of the resonance circuit. When transmitting the electric power, the electric power transmitting device controls the first coil to connect or disconnect both ends thereof so as to bring a resonance frequency of the resonance circuit close to a frequency of an electric power transmission signal outputted as the electric power to be transmitted.

3 Claims, 17 Drawing Sheets

(51) Int. Cl.
*H02J 7/02* (2016.01)
*H02J 50/12* (2016.01)
*H02J 50/50* (2016.01)

(52) U.S. Cl.
CPC ............ *H02J 50/60* (2016.02); *H04B 5/0031* (2013.01); *H04B 5/0075* (2013.01); *H04B 5/0087* (2013.01); *H04B 5/0093* (2013.01)

(58) Field of Classification Search
USPC ........................................................ 307/104
See application file for complete search history.

(56) References Cited

U.S. PATENT DOCUMENTS

| | | | |
|---|---|---|---|
| 8,198,894 B2 | 6/2012 | Kaneko et al. | |
| 8,229,373 B2 | 7/2012 | Tanoue et al. | |
| 8,803,365 B2 | 8/2014 | Lee et al. | |
| 9,236,771 B2 | 1/2016 | Toncich et al. | |
| 2002/0113600 A1 | 8/2002 | Swank | |
| 2010/0052431 A1 | 3/2010 | Mita | |
| 2010/0291946 A1 | 11/2010 | Yamakawa et al. | |
| 2011/0018358 A1 | 1/2011 | Kozakai | |
| 2011/0156640 A1 | 6/2011 | Moshfeghi | |
| 2011/0169337 A1 | 7/2011 | Kozakai | |
| 2012/0161529 A1 | 6/2012 | Kamata et al. | |
| 2012/0175968 A1* | 7/2012 | Katsunaga | H02J 7/025 307/104 |
| 2012/0235509 A1 | 9/2012 | Ueno et al. | |
| 2012/0267960 A1 | 10/2012 | Low et al. | |
| 2012/0286582 A1 | 11/2012 | Kim et al. | |
| 2013/0038281 A1 | 2/2013 | Sakakibara et al. | |
| 2013/0307345 A1* | 11/2013 | Kobayashi | H04B 5/0037 307/104 |
| 2013/0328408 A1 | 12/2013 | Georgakopoulos et al. | |
| 2014/0028407 A1 | 1/2014 | Chern et al. | |
| 2014/0191586 A1 | 7/2014 | Ichikawa | |
| 2014/0203662 A1* | 7/2014 | Bae | H02J 50/90 307/104 |

FOREIGN PATENT DOCUMENTS

| | | |
|---|---|---|
| JP | 2012-143117 A | 7/2012 |
| JP | 2013-078166 A | 4/2013 |
| WO | 2011/099106 A1 | 8/2011 |
| WO | 2013/035986 A1 | 3/2013 |

OTHER PUBLICATIONS

Chinese Office Action dated Oct. 18, 2017 issued in Chinese Patent Application No. 2014102892431 (with English translation).
Chinese Office Action issued in corresponding Chinese Patent Application No. 2014102892431, dated Jul. 11, 2018, with English Translation.
Non-Final Office Action issued in parent U.S. Appl. No. 14/313,617 dated Jul. 14, 2017.
Final Office Action issued in parent U.S. Appl. No. 14/313,617 dated Apr. 19, 2018.
Notice of Allowance issued in parent U.S. Appl. No. 14/313,617 dated Aug. 24, 2018.

* cited by examiner

FIG. 4
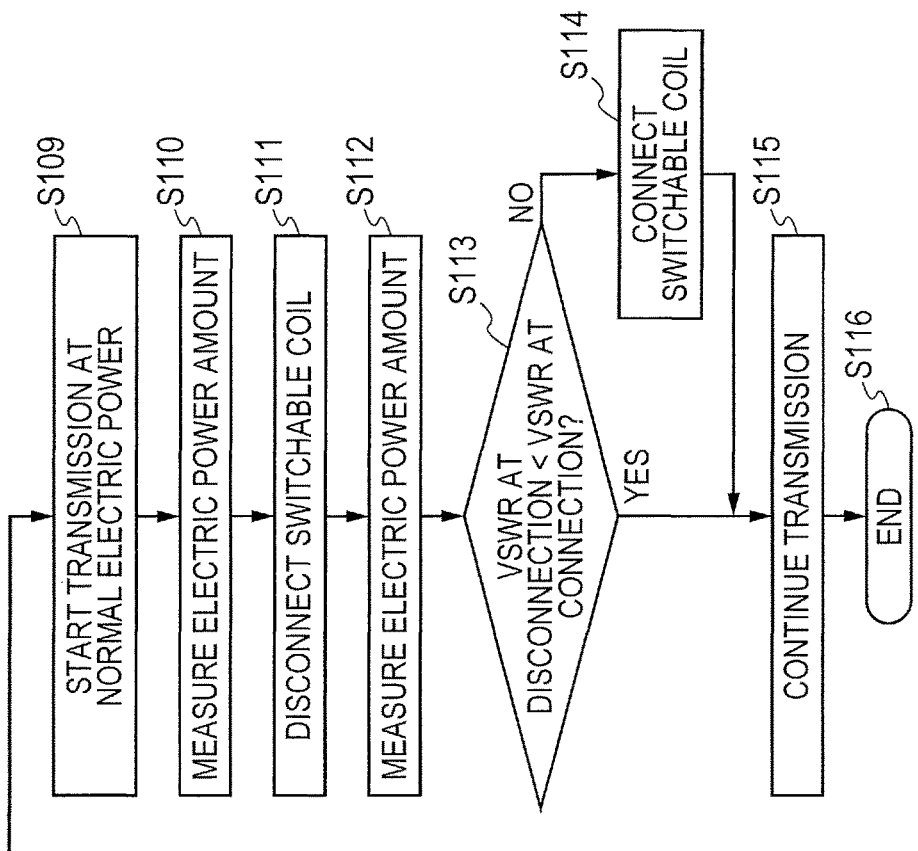
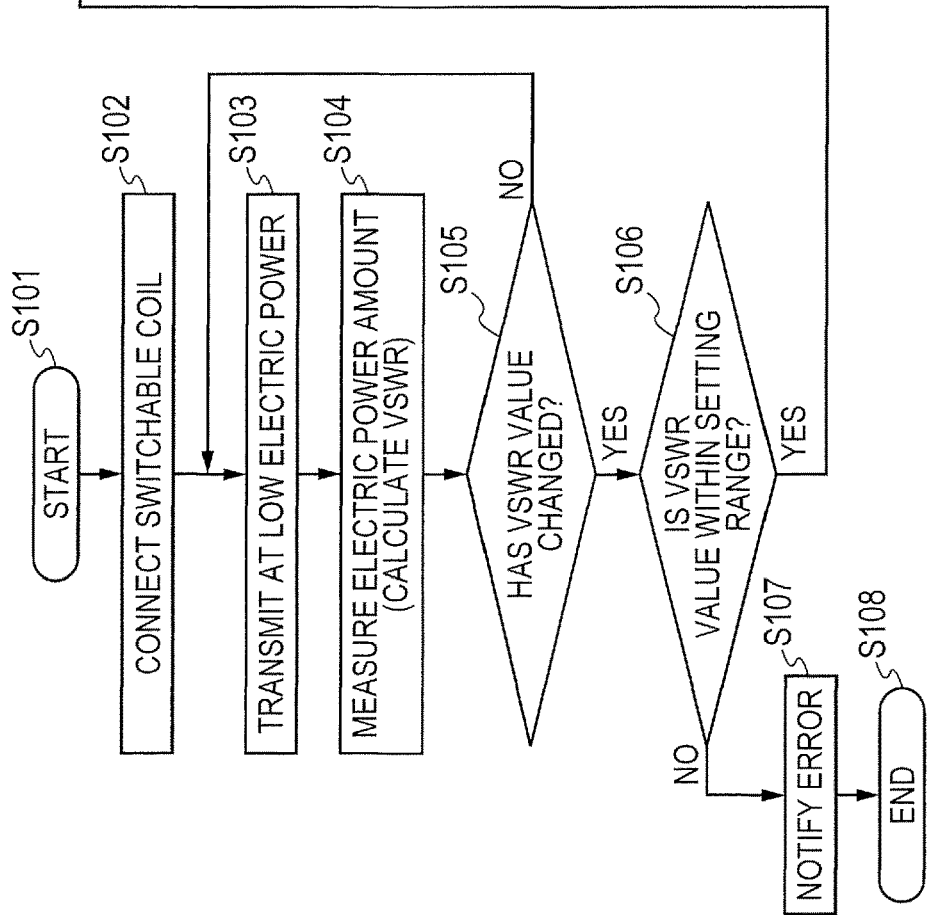

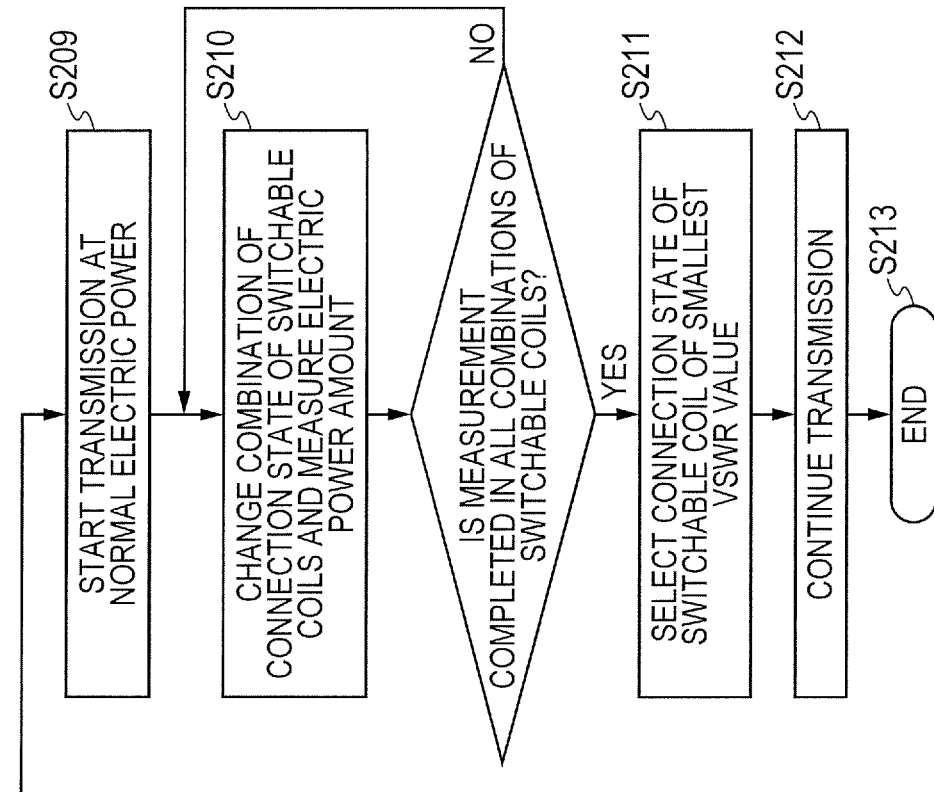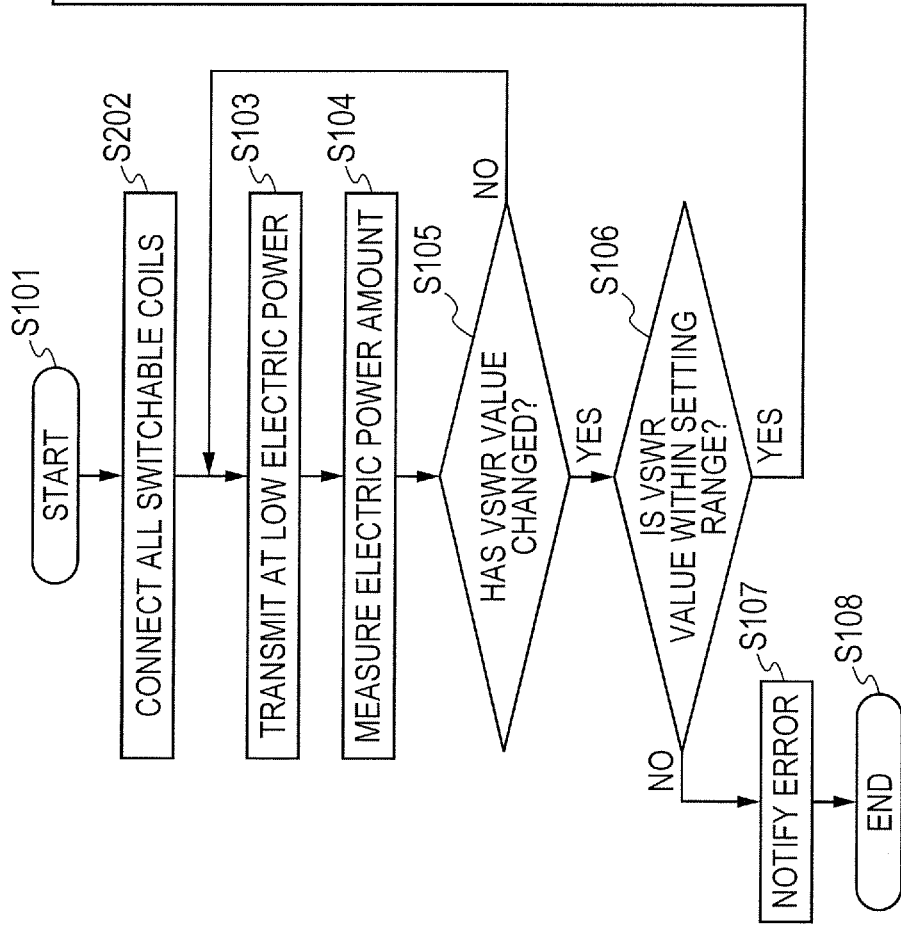
FIG. 7

ELECTRIC POWER TRANSMITTING DEVICE, NON-CONTACT POWER SUPPLY SYSTEM, AND CONTROL METHOD

CROSS-REFERENCE TO RELATED APPLICATIONS

This is a Divisional of U.S. patent application Ser. No. 14/313,617, filed on Jun. 24, 2014, which claims the benefit of Japanese Patent Application No. 2013-132529, filed on Jun. 25, 2013 including the specification, drawings and abstract are incorporated herein by reference in their entirety.

BACKGROUND

The present invention relates to an electric power transmitting device which transmits electric power in a non-contact manner, a non-contact power supply system which includes the electric power transmitting device, and a control method of the non-contact power supply system, and relates to technology which is effective when applied to an electric power transmitting device utilizing resonant coupling of an electromagnetic field (magnetic resonance), for example.

Practical utilization is advancing in a system using non-contact power transmission which supplies electric power to an electrical machinery and apparatus in a non-contact manner without the intermediary of a power cord, etc. (hereinafter called a "non-contact power supply system"). For example, the well-known non-contact power supply system includes an electromagnetic induction type which utilizes electromagnetic induction between antennae (coils) arranged mutually spaced out, and a magnetic resonance type which utilizes resonant coupling of an electromagnetic field. The NFC (Near Field Communication) specifications are also known as the standards related to non-contact communication technology by which information is transmitted wirelessly. Furthermore, an IC card and a small mobile terminal device in conformity with the NFC specifications are also beginning to spread.

The resonance-type non-contact power supply system is implemented with the use of a resonance circuit including a coil and a capacitor. One of the features is that, compared with the electromagnetic induction type in the past, the resonance-type non-contact power supply system allows long transmission distance between an electric power transmission coil and an electric power reception coil by making Q values of the coils high, and that the resonance-type non-contact power supply system is strong against the displacement between the electric power transmission coil and the electric power reception coil.

In order to realize an efficient non-contact power transmission, it is desirable to transmit electric power by matching the frequency of an electric power transmission signal outputted as the electric power to be transmitted from an electric power transmitting device (hereinafter called "electric power transmission frequency") and the resonance frequency of a resonance circuit. However, the magnetic resonance type allows transmission in a narrow band region of the frequency characteristic of the coil; therefore, there arises a problem that the resonance frequency of the resonance circuit deviates and the transmission characteristic changes, due to, for example, the change of the parasitic capacitance between windings of the coils by change of the distance between the electric power transmission coil and the electric power reception coil, and due to the influence of a metal part of a housing of the electric power receiving device. Patent Literatures 1 and 2 cited below disclose one of related art technology for realizing efficient non-contact power transmission in the resonance-type non-contact power supply system.

When a resonance frequency of a resonance circuit deviates due to load fluctuation on a receiving side, Patent Literature 1 discloses a technology to cope with the deviation of the resonance frequency, by changing an electric power transmission frequency of the high-frequency power supply to match it with the resonance frequency, and by matching an impedance of a high-frequency power supply on the transmitting side with an input impedance of a transmitting antenna coupled to the high-frequency power supply, by means of a variable impedance circuit.

In order to change or expand the power transmission area which has been restricted to a near range from a transmitting antenna, Patent Literature 2 discloses a technology in which, in a wireless power supply device (a transmitting-side device), the transmitting antenna and plural repeating coils are formed in a sheet shape and arranged in a sheet-shaped main body at the prescribed intervals, where the repeating coils receive and transmit the electric power transmitted from the transmitting antenna in a magnetic resonance relationship.

PATENT LITERATURE (Patent Literature 1) Published Japanese Unexamined Patent Application No. 2012-143117
(Patent Literature 2) Published Japanese Unexamined Patent Application No. 2011-151989

SUMMARY

The configuration disclosed by Patent Literature 1 aims at the impedance matching by means of the variable impedance circuit; however, the problem is that inserting the variable impedance circuit causes the circuit scale to increase and the transmission efficiency to degrade. For example, when a variable condenser, which can adjust its capacitance value by adjusting an inter-electrode area mechanically, is employed as the variable capacity configuring the variable impedance circuit, the problem is that the circuit scale becomes large since the variable condenser is a mechanical type and large in shape. When a semiconductor device, such as a variable capacitance diode, is employed as the variable capacity configuring the variable impedance circuit, there is a possibility that the transmission efficiency may fall due to the loss of the semiconductor device. Another problem is that the withstand voltage of the semiconductor device is not high enough, depending on an amount of electric power transmission.

The configuration of Patent Literature 1 changes the electric power transmission frequency of the high-frequency power supply in order to match it with the resonance frequency. However, when the electric power transmission frequency changes, there is a high possibility that interference will occur with other devices than the non-contact power supply system; therefore, it is desirable to fix the electric power transmission frequency as much as possible.

The configuration of Patent Literature 2 transmits electric power to a receiving side via a repeating coil, and it does not consider in particular the improvement of the transmission efficiency in transmitting electric power directly from a transmitting antenna to the receiving side.

Solutions to such problems will be explained in the following. The other issues and new features of the present invention will become clear from the description of the present specification and the accompanying drawings.

The following explains briefly an outline of typical embodiments to be disclosed by the present application.

The electric power transmitting device according to the present invention is configured with a resonance circuit including a resonance capacity and a resonance coil acting as a transmitting antenna, and a first coil arranged magnetically coupled with the resonance coil. The electric power transmitting device transmits electric power in a non-contact manner with the use of resonant coupling of the resonance circuit. When transmitting the electric power, the electric power transmitting device controls the first coil to connect or disconnect both ends thereof so as to bring a resonance frequency of the resonance circuit close to a frequency of an electric power transmission signal outputted as the electric power to be transmitted.

The following explains briefly an effect obtained by the typical embodiments to be disclosed in the present application.

That is, according to the present electric power transmitting device, it becomes possible to improve the transmission efficiency of the electric power, suppressing the circuit scale.

BRIEF DESCRIPTION OF THE DRAWINGS

FIG. 4 is a flow chart illustrating an example of a flow of the transmission control in the non-contact power supply system according to Embodiment 1;

FIG. 7 is a flow chart illustrating an example of a flow of the transmission control in the non-contact power supply system including the electric power transmitting device according to Embodiment 2;

DETAILED DESCRIPTION

1. Outline of Embodiments

Figure 1:
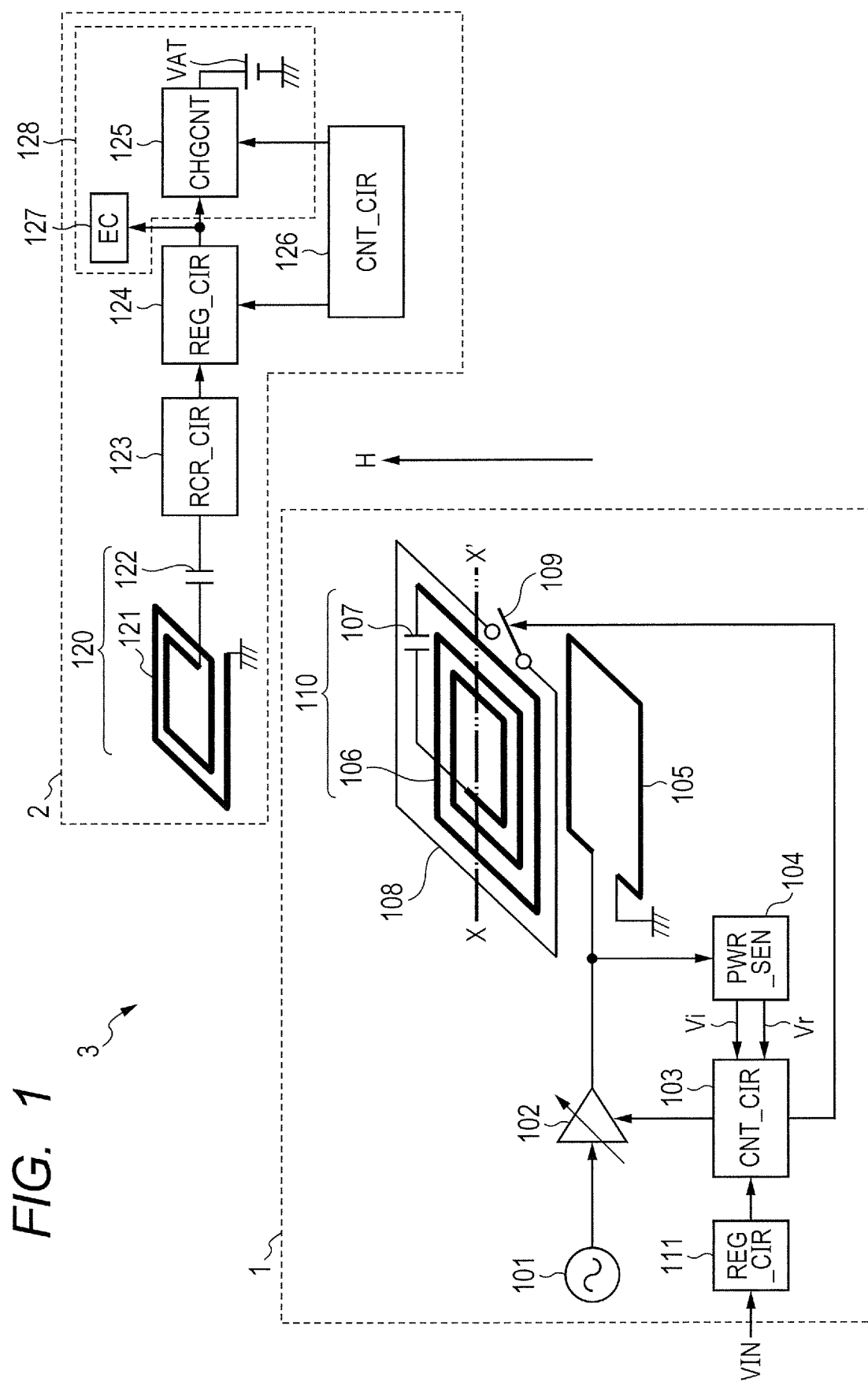
FIG. 1 is a drawing illustrating a non-contact power supply system including an electric power transmitting device according to Embodiment 1.

First, an outline of a typical embodiment of the invention disclosed in the present application is explained. A numerical symbol of the drawing referred to in parentheses in the outline explanation about the typical embodiment only illustrates what is included in the concept of the component to which the numerical symbol is attached.

<1> (An Electric Power Transmitting Device which Controls the Connection or Disconnection of a Switchable Coil Magnetically Coupled with a Resonance Coil, so as to Bring the Resonance Frequency Close to the Electric Power Transmission Frequency)

An electric power transmitting device (1, 4, 5) according to a typical embodiment of the present application is configured with a resonance circuit (110) including a resonance capacity (107) and a resonance coil (106) acting as a transmitting antenna, and with a first coil (108, 108_1-108_n, 114 and 115, 150_1-150_m, 201-204) arranged magnetically coupled with the resonance coil. The electric power transmitting device transmits electric power in a non-contact manner with the use of resonant coupling of the resonance circuit. When transmitting the electric power, the electric power transmitting device controls the first coil to connect or disconnect both ends thereof, so as to bring a resonance frequency of the resonance circuit close to a frequency (fTx) of an electric power transmission signal outputted as the electric power to be transmitted.

For example, when both ends of the first coil are disconnected, electric current does not flow through the first coil; therefore, the influence of the first coil on the resonance coil can be ignored. On the other hand, when both ends of the first coil are connected, electric current flows through the first coil since the first coil couples with a magnetic flux of the resonance coil. This electric current generates a magnetic flux emanating from the first coil, and the magnetic flux acts in the direction which reduces the magnetic flux of the resonance coil. As a result, the self-inductance of the resonance coil decreases, causing the resonance frequency of the resonance circuit to change to the direction of a higher frequency. That is, according to the present electric power transmitting device, it is possible to change the resonance frequency of the resonance circuit which is configured with the resonance coil, by connecting or disconnecting both ends of the first coil. When compared with a configuration in which a variable impedance circuit is coupled in series with a resonance coil, as in the configuration disclosed by Patent Literature 1 cited above, the present configuration contributes to the improvement of the transmission efficiency, since occurrence of a loss can be suppressed. It is also possible to make the circuit scale small, compared with the configuration in which the variable impedance circuit is provided as described above.

<2> (Plural Switchable Coils)

The electric power transmitting device according to Paragraph 1 includes plural (n) first coils. In the present electric power transmitting device, each of the first coils (108_1-108_n, 114, 115, 150_1-150_m, 201-204) can separately control the connection state of connecting or disconnecting both ends thereof.

According to the present configuration, it is possible to make the adjustable width of the resonance frequency narrow and to expand the adjustable range of the resonance frequency. Therefore, it is possible to improve furthermore the adjustment accuracy of the resonance frequency.

<3> (Plural Switchable Coils Having Mutually Different Length and Arranged Concentrically)

In the electric power transmitting device according to Paragraph 2, each of the first coils (108_1-108_n) has mutually different length and is arranged concentrically surrounding the resonance coil.

According to the present configuration, it becomes easy to form each of the first coils and the resonance coil so as to be magnetically coupled. Each of the first coils is arranged at a respectively different distance to the resonance coil; accordingly, it is possible to realize a configuration in which the adjustable width of the resonance frequency by switching the connection state of each of the first coils is different respectively. Furthermore, since the first coil and the resonance coil are arranged in the same plane, it becomes easy to form those coils in the housing of the electric power transmitting device.

<4> (Plural Switchable Coils Arranged so as to Overlap with at Least a Part of the Resonance Coil)

In the electric power transmitting device (4) according to Paragraph 2, each of the first coils (114, 115, 201-204) is arranged mutually spaced out in the same plane, so as to overlap with a part of the resonance coil in the height direction.

According to the present configuration, it becomes easy to form each of the first coils so as to be magnetically coupled with the resonance coil.

<5> (Plural Switchable Coils Arranged so as to Equally Overlap with the Resonance Coil)

In the electric power transmitting device according to Paragraph 4, each of the first coils (201-204) is arranged so as to have a substantially equal overlapping part with the resonance coil.

According to the present configuration, for example, it becomes possible to adjust the resonance frequency more appropriately to the deviation of the resonance frequency due to the position at which a device on the receiving side is placed.

<6> (Wireless Communications Using One of the Plural First Coils)

In the electric power transmitting device according to Paragraphs 4 or 5, wireless data communications are possible with one of the first coils acting as an antenna.

According to the present configuration, it is possible to employ one of the first coils provided for adjusting the resonance frequency, for the wireless communications. Therefore, it is not necessary to provide an antenna for the wireless communications separately, contributing to realization of a small-scale electric power transmitting device.

<7> (An Antenna for Wireless Communications is Selectable)

In the electric power transmitting device according to Paragraph 6, one of the first coils is selectable as the antenna for the wireless data communications.

According to the present configuration, for example, it becomes possible to perform wireless communications using one of the first coils which exhibits the most favorable communication condition, depending on the arrangement of a device on the receiving side.

<8> (NFC Communications)

In the electric power transmitting device according to Paragraphs 6 or 7, the data communications are in conformity with the NFC specifications.

<9> (The Connection State of the Switchable Coil is Selected so as to Reduce a Reflected Amount)

The electric power transmitting device (1, 4) according to one of Paragraph 1 through Paragraph 8 generates an AC signal corresponding to the electric power to be transmitted, and is further configured with a power supply unit (101, 102) which supplies electric power to the resonance circuit, a power sensing unit (104) which detects a reflected amount of the AC signal supplied to the resonance circuit from the power supply unit, and a control unit (103). The control unit switches the connection state of the first coil so as to minimize the reflected amount.

According to the present configuration, in the electric power transmitting device, it becomes easy to control to bring the resonance frequency of the resonance circuit on the transmitting side close to the electric power transmission frequency.

<10> (VSWR)

In the electric power transmitting device according to Paragraph 9, the power sensing unit generates a first voltage (Vi) corresponding to an incident electric power of the AC signal supplied to the resonance circuit from the power supply unit, and a second voltage (Vr) corresponding to a reflected electric power of the AC signal. The control unit calculates a voltage standing wave ratio (VSWR) on the basis of the first voltage and the second voltage, and determines the magnitude of the reflected amount on the basis of the calculated result.

According to the present configuration, it becomes easy to estimate the reflected amount of the AC signal.

<11> (A One-Turn Switchable Coil)

In the electric power transmitting device according to one of Paragraph 2 through Paragraph 10, the number of turns of the first coil is one turn.

According to the present configuration, it is possible to suppress an adverse effect on electric power transmission due to the resonance circuit.

<12> (A Switchable Coil Arranged in the Same Plane with the Resonance Coil, Surrounding the Resonance Coil)

In the electric power transmitting device according to Paragraph 1, the first coil is arranged in the same plane with the resonance coil, surrounding the resonance coil.

According to the present configuration, it becomes easy to form the first coil so as to be magnetically coupled with the resonance coil. Furthermore, since the first coil and the resonance coil are arranged in the same plane, it becomes easy to form those coils in the housing of the electric power transmitting device.

<13> (Electric Power Transmission is Performed with the Switchable Coil being Connected and Subsequently the Switchable Coil is Disconnected when the Resonance Frequency Deviates.)

The electric power transmitting device according to Paragraph 12 transmits electric power in the state where both ends of the first coil are connected, and when it is detected that the resonance frequency has deviated, the electric power transmitting device transmits electric power in the state where both ends of the first coil are disconnected.

According to the present electric power transmitting device, it is possible to shift the resonance frequency to a lower frequency, by changing the connection state of the first coil from both ends being connected to both ends being disconnected. With the present configuration, for example, when an electric power receiving device is placed near the electric power transmitting device and the resonance frequency of the electric power transmitting device deviates to a higher frequency, it is possible to compensate the deviation of the resonance frequency by simpler control, leading to an improvement of the transmission efficiency of electric power.

<14> (A Non-Contact Power Supply System)

A non-contact power supply system (3) according to a typical embodiment of the present application includes an electric power transmitting device (1) according to one of Paragraph 1 through Paragraph 13, and an electric power receiving device (2) which receives the electric power supplied by the electric power transmitting device in a non-contact manner, with the use of electromagnetic resonant coupling utilizing a resonance circuit (120).

According to the present configuration, it is possible to realize a reliable non-contact power supply system.

<15> (An Electric Power Transmitting Device Provided with a Switchable Coil Arranged Between a Resonance Coil and a Repeating Coil which are Arranged in a Line in the Same Plane)

Another electric power transmitting device (8) according to a typical embodiment of the present application is configured with a resonance circuit (110) including a resonance capacity (107) and a resonance coil (106) acting as a transmitting antenna, a first repeating circuit (401) including a first capacitor (302) and a first repeating coil (301) arranged magnetically coupled with the resonance coil, and a first coil (303) arranged magnetically coupled with both of the resonance coil and the repeating coil. The present electric power transmitting device transmits electric power in a non-contact manner with the use of resonant coupling of the resonance circuit and the first repeating circuit. In the electric power transmitting device, the resonance coil and the first repeating coil are arranged in the same plane. The first coil is arranged so as to overlap with both the resonance coil and the first repeating coil in the height direction (H), and it is possible to switch between connection and disconnection of both ends of the first coil.

According to the examination of the inventors of the present invention, in the boundary area of the first repeating coil and the resonance coil, there exists a place of extremely weak electric power to be transmitted (the so-called null point), at which the magnetic flux of the first repeating coil and the magnetic flux of the resonance coil cancel out each other. Therefore, if an electric power receiving device is placed in the boundary area, it is likely that a sufficient electric power cannot be transmitted to the electric power receiving device. According to the present electric power transmitting device, it is possible to shift the position of the null point by switching the connection state (connected or disconnected) of both ends of the first coil. Therefore, even if the electric power receiving device is placed in the boundary area, it becomes possible to transmit a sufficient electric power to the electric power receiving device, leading to the improvement of the transmission efficiency of electric power.

<16> (A Switchable Coil Arranged Between Repeating Coils)

An electric power transmitting device according to Paragraph 15 is further configured with a second repeating circuit (402) including a second capacitor (306) and a second repeating coil (305) arranged magnetically coupled with the first repeating coil, and the second coil (307) arranged magnetically coupled with both the first repeating coil and the second repeating coil. In the present electric power transmitting device, the first repeating coil and the second repeating coil are arranged in the same plane. The second coil is arranged so as to have an overlapping part in the height direction (H) with both the first repeating coil and the second repeating coil, and it is possible to switch between connection and disconnection of both ends.

According to the present configuration, it is possible to shift the position of the null point existing in the boundary area of the first repeating coil and the second repeating coil, by switching the connection state (connected or disconnected) of both ends of the second coil. Therefore, even if the electric power receiving device is placed in the boundary area, it becomes possible to transmit a sufficient electric power to the electric power receiving device, leading to the improvement of the transmission efficiency of electric power.

<17> (The Connection State of the Switchable Coil is Controlled so as to Minimize a Reflected Amount)

The electric power transmitting device according to Paragraph 16 generates an AC signal corresponding to the electric power to be transmitted, and is configured with a power supply unit (101, 102) which supplies electric power to the resonance circuit, a power sensing unit (104) which detects a reflected amount of the AC signal supplied to the resonance circuit from the power supply unit, and a control unit (103). The control unit switches between connection and disconnection of both ends of the first coil and both ends of the second coil, respectively, so as to minimize the reflected amount.

According to the present configuration, it becomes easy to improve the transmission efficiency of electric power by shifting the position of the null point.

<18> (A Control Method; the Connection or Disconnection of Plural Switchable Coils is Controlled so as to Bring the Resonance Frequency Close to the Electric Power Transmission Frequency)

A control method according to the typical embodiment of the present application is a method for controlling electric power transmission in an electric power transmitting device (4) for transmitting electric power in a non-contact manner with the use of resonant coupling of the resonance circuit. The electric power transmitting device (4) is configured with a resonance circuit (110) including a resonance capacity (107) and a resonance coil (106) acting as a transmitting antenna, and with plural first coils (201-204) arranged magnetically coupled with the resonance coil. Each of the first coils can separately control the connection state of connecting or disconnecting both ends thereof. This control method includes a first step (S210 and S211) in which the electric power transmitting device searches for a combination of the connection state of each of the first coils so as to minimize a reflected amount of an AC signal supplied to the resonance circuit; and a second step (S212) in which the electric power transmitting device transmits electric power in the connection state of the first coils searched in the first step.

According to the present method, it is possible to transmit the electric power by selecting the state where deviation of the resonance frequency on the transmitting side to the transmission frequency becomes the smallest. Therefore, it is possible to improve further the transmission efficiency of electric power.

<19> (Electric Power Transmission Starts with Low Electric Power, and Subsequently Changes to High Electric Power)

The control method according to Paragraph 18 includes a third step (S202 and S103) in which the electric power transmitting device starts the electric power transmission with a second electric power lower than a first electric power in a state where both ends of each of the first coils are connected, and a fourth step (S104) in which the electric power transmitting device estimates the reflected amount when the electric power is transmitted with the second electric power in the state where both ends of each of the first coils are connected. The control method further includes a fifth step (S105) in which the electric power transmitting device determines whether the reflected amount estimated in the fourth step is deviated from a prescribed reference value, and a sixth step (S106) in which the electric power transmitting device determines whether the reflected amount is within a prescribed range when it has been determined that the reflected amount is deviated from the prescribed reference value in the fifth step. The control method further includes a seventh step (S209) in which the electric power transmitting device transmits the electric power by changing from the second electric power to the first electric power when it has been determined that the reflected amount is within the prescribed range in the sixth step, and an eighth step (S107 and S108) in which the electric power transmitting device stops the electric power transmission when it has been determined that the reflected amount is not within the prescribed range in the sixth step. The first step is executed after the seventh step.

According to the present method, even when there exists foreign substance already at the time of transmission start, it is possible to make an adverse affect exerted on the foreign substance small, by starting the electric power transmission with low electric power first, and by increasing the electric power subsequently. Therefore, it is possible to enhance the reliability of the transmission control in the non-contact power transmission system. By determining whether there is a change of the estimated reflected amount, and by determining the magnitude of the change, it is possible to determine, with a sufficient accuracy, whether the electric power receiving device is placed within the power transmission area of the electric power transmitting device (whether the foreign substance has invaded into the power transmission area).

<20> (VSWR)

In the control method according to Paragraph 18 or Paragraph 19, the reflected amount is estimated on the basis of a value of the voltage standing wave ratio (VSWR) which is calculated from a first voltage (Vi) corresponding to an incident electric power of the AC signal supplied to the resonance circuit, and a second voltage (Vr) corresponding to a reflected electric power of the AC signal.

According to the present method, it is possible to grasp the reflected amount of the AC signal supplied to the resonance circuit on the transmitting side with a sufficient accuracy.

<21> (Wireless Communications Performed with the Use of One Switchable Coil)

The control method according to one of Paragraph 18 through Paragraph 20 further includes a ninth step in which the electric power transmitting device starts wireless data communications with the use of one of the first coils.

According to the present method, it is possible to realize the wireless data communications without providing an antenna for wireless communications separately.

<22> (when the Wireless Communications Cannot be Established, the Wireless Communications are Retried after Changing One of the First Coils with Both Ends to be Connected)

The control method according to Paragraph 21, further includes a tenth step in which, when the wireless communications cannot be established in the ninth step, the electric power transmitting device starts the wireless data communications after changing one of the first coils of which both ends are to be connected.

According to the present method, it is possible to establish the wireless communications with a more favorable communication condition.

<23> (Plural Switchable Coils Arranged so as to Overlap in the Height Direction)

In the electric power transmitting device (4) according to Paragraph 2, one of the first coils (150_1) is arranged in the same plane as the resonance coil, surrounding the resonance coil, and the remaining first coils (150_2-150_m) are arranged spaced out in the height direction (H), respectively, so as to have an overlapping part with the one of the first coils.

According to the present configuration, it becomes easy to form each of the first coils so as to be magnetically coupled with the resonance coil.

<24> (A Control Method; Control is Performed so as to Bring the Resonance Frequency Close to the Electric Power Transmission Frequency by Controlling Connection or Disconnection of One Switchable Coil)

Another control method according to the typical embodiment of the present application is a method for controlling electric power transmission in an electric power transmitting device (1) for transmitting electric power in a non-contact manner with the use of resonant coupling of the resonance circuit. The electric power transmitting device (1) is configured with a resonance circuit (110) including a resonance capacity (107) and a resonance coil (106) acting as a transmitting antenna, and with a first coil (108) arranged magnetically coupled with the resonance coil. The control method includes a first step (S102-S110) in which the electric power transmitting device estimates the reflected amount of the AC signal supplied to the resonance circuit when the electric power is transmitted in the state where both ends of the first coil are connected, and a second step (S111 and S112) in which the electric power transmitting device estimates the reflected amount of the AC signal supplied to the resonance circuit when the electric power is transmitted in the state where both ends of the first coil are disconnected. The control method further includes a third step (S113) in which the electric power transmitting device compares the reflected amount estimated in the first step in the state where both ends of the first coil are connected, and the reflected amount estimated in the second step in the state where both ends of the first coil are disconnected. The control method further includes a fourth step (S115) in which, when the reflected amount in the state where both ends of the first coil are disconnected is smaller than the reflected amount in the state where both ends of the first coil are connected, the electric power transmitting device continues the electric power transmission in the state where both ends of the first coil are disconnected. The control method further includes a fifth step (S114 and S115) in which, when the reflected amount in the state where both ends of the first coil are disconnected is larger than the reflected amount in the state where both ends of the first coil are connected, the electric power transmitting device continues the electric power transmission in the state where both ends of the first coil are connected.

According to the present method, it is possible to transmit the electric power by selecting the state where deviation of the resonance frequency on the transmitting side to the transmission frequency becomes smaller, leading to the improvement of the transmission efficiency of electric power.

<25> (Starting with a Low Electric Power and Changing to a High Electric Power when it is Normal)

In the control method according to Paragraph 24, the first step includes a sixth step (S103) in which the electric power transmitting device starts the electric power transmission with a second electric power lower than a first electric power in a state where both ends of the first coil are connected, and a seventh step (S104) in which the electric power transmitting device estimates the reflected amount when the electric power is transmitted with the second electric power in the state where both ends of the first coils are connected. The first step further includes an eighth step (S105) in which the electric power transmitting device determines whether the reflected amount estimated in the seventh step is deviated from a prescribed reference value, and a ninth step (S106) in which the electric power transmitting device determines whether the reflected amount is within a prescribed range when it has been determined that the reflected amount is deviated from the prescribed reference value in the eighth step. The first step further includes a tenth step (S109) in which the electric power transmitting device transmits the electric power by changing from the second electric power to the first electric power when it has been determined that the reflected amount is within the prescribed range in the ninth step, and an eleventh step (S107 and S108) in which the electric power transmitting device stops the electric power transmission when it has been determined that the reflected amount is not within the prescribed range in the ninth step. The first step further includes, after the tenth step, an eleventh step (S110) in which the electric power transmitting device estimates the reflected amount when the electric power is transmitted with the first electric power in the state where both ends of the first coil are connected. The second step is executed after the eleventh step.

According to the present method, even when there exists foreign substance already at the time of transmission start, it is possible to make influence exerted on the foreign substance small, by starting the electric power transmission with low electric power first, and by enlarging the electric power subsequently. Therefore, it is possible to enhance the reliability of the transmission control in the non-contact power transmission system. By determining whether there is a change of the estimated reflected amount, and by determining the magnitude of the change, it is possible to determine, with a sufficient accuracy, whether the electric power receiving device is placed within the power transmission area of the electric power transmitting device (whether the foreign substance has invaded into the power transmission area).

<26> (VSWR)

In the control method according to one of Paragraph 24 and Paragraph 25, the reflected amount is estimated on the basis of a value of the voltage standing wave ratio (VSWR) which is calculated from a first voltage (Vi) corresponding to an incident electric power of the AC signal supplied to the resonance circuit, and a second voltage (Vr) corresponding to a reflected amount of the AC signal.

According to the present method, it is possible to grasp the reflected amount of the AC signal supplied to the resonance circuit on the transmitting side with a sufficient accuracy.

2. Details of Embodiments

The embodiments are further explained in full detail. In the entire diagrams for explaining the embodiments of the present invention, the same symbol is attached to an element which possesses the same function, and the repeated explanation thereof is omitted.

Embodiment 1

<Outline of a Non-Contact Power Supply System>

FIG. 1 illustrates a non-contact power supply system including an electric power transmitting device according to Embodiment 1. The non-contact power supply system 3 illustrated in the figure includes an electric power transmitting device 1 and an electric power receiving device 2. In the non-contact power supply system 3, the electric power supply from the electric power transmitting device 1 to the electric power receiving device 2 is possible in a non-contact manner (wirelessly). Although not restricted in particular, in the non-contact power supply system 3, non-contact power transmission is realized by the magnetic resonance method utilizing resonant coupling of an electromagnetic field. In the non-contact power transmission, the frequency of an electric power transmission signal (electric power transmission frequency) outputted as the electric power to be transmitted is a frequency of several MHz zone, for example.

<A Configuration of the Electric Power Transmitting Device 1>

The electric power transmitting device 1 is configured with, for example, an oscillator 101, a transmitting amplifier 102, a control circuit (CNT_CIR) 103, a power sensing unit (PWR_SEN) 104, an electric power supply coil 105, a resonance coil 106, a resonance capacity 107, a switchable coil 108, a change-over switch 109, and a voltage regulator circuit (REG_CIR) 111.

The oscillator 101 generates an AC signal of a frequency corresponding to an electric power transmission signal for transmitting the electric power to be transmitted from the electric power transmitting device 1. Although not restricted in particular, the frequency of the AC signal outputted from the oscillator 101 is fixed and equal to the frequency of the electric power transmission signal (electric power transmission frequency) fTx. The transmitting amplifier 102 amplifies the AC signal outputted from the oscillator 101, and generates a driving signal corresponding to the magnitude of the electric power to be transmitted. The transmitting amplifier 102 is a variable gain amplifier of which the amplification factor can be changed. The transmitting amplifier 102 operates at a voltage generated by the voltage regulator circuit 111 as a power supply, for example, and its amplification factor can be changed by adjusting a bias voltage or a bias current which are supplied to the transmitting amplifier 102. The voltage regulator circuit 111 generates plural voltages used as an operation power supply of each functional section of the electric power transmitting device 1, on the basis of an input voltage VIN supplied from a power supply adapter, a universal serial bus (USB), etc. For example, the voltage regulator circuit 111 generates a voltage used as an operation power supply of the transmitting amplifier 102 as described above, and a voltage used as an operation power supply of the control circuit 103.

The driving signal outputted from the transmitting amplifier 102 is supplied to the electric power supply coil 105. The electric power supply coil 105 and the resonance coil 106 are coupled magnetically, and an AC power according to the driving signal supplied to the electric power supply coil 105 is supplied to the resonance coil 106 by electromagnetic induction. The resonance coil 106 as a transmitting antenna and the resonance capacity 107 compose a resonance circuit 110 on the primary side. The resonance circuit 110 is a parallel resonant circuit where the resonance coil 106 and the resonance capacity 107 are coupled in parallel, for example. When a magnetic field is generated by resonance by means of the resonance circuit 110, the electric power is outputted from the electric power transmitting device 1.

In order to generate a strong magnetic field by the resonance coil 106 and the resonance capacity 107, it is necessary to increase Q value of the resonance coil 106. The Q value of a coil is explained here. The Q value of a coil is called sharpness, selectivity, etc., and expressed by the following equation, where L is the inductance of a coil, r is the winding resistance component of the coil, and ω is the angular velocity of the electric power transmission frequency fTx.

$$Q = \frac{\omega L}{r}.$$ [Mathematical 1]

As understood from Equation (1), in order to increase the Q value, what is necessary is to decrease the resistance component r of the coil and to employ a low loss coil. Therefore, it is preferable to attain a low loss by employing the wire material of copper with a small resistance component as the wire material used for the coil, and by employing the wire with a large diameter as much as possible.

The constants of the resonance coil 106 and the resonance capacity 107 are set in advance so as to match the resonance frequency of the resonance circuit 110 with the electric power transmission frequency fTx. Accordingly, the electric power is efficiently supplied from the electric power supply coil 105 to the resonance circuit 110 by magnetic coupling, and at the same time, a magnetic field is generated efficiently from the resonance coil 106 and couples strongly with a resonance circuit 120 of the electric power receiving device 2.

However, as described above, due to a change of the parasitic capacitance between the windings of the coils by variation of the distance between the resonance coil 106 on the transmitting side and the receiving coil 121 on the receiving side, and due to influence of a metal part of the housing of the electric power receiving device 2, it is likely that the resonance frequency of the resonance circuit 110 may deviate, causing deterioration of the transmission efficiency of electric power. Accordingly, in the electric power transmitting device 1 according to the present embodiment, the switchable coil 108 arranged so as to be coupled magnetically with the resonance coil 106 is provided and the connection state of both ends of the switchable coil 108 is switched. By the present configuration, it becomes possible to adjust the resonance frequency of the resonance circuit 110. The details of the switchable coil 108 are described later.

The power sensing unit 104 is provided for sensing the reflected amount of the driving signal supplied to the resonance circuit 110 from the transmitting amplifier 102. Specifically, the power sensing unit 104 generates a voltage Vi corresponding to the incident electric power of the driving signal supplied to the resonance circuit 110 from the transmitting amplifier 102, and a voltage Vr corresponding to the reflected electric power of the driving signal. As the power sensing unit 104, a CM directional coupler can be employed, for example.

The control circuit 103 includes a program execution device which executes data processing according to a program stored in a memory, etc. The control circuit 103 is a micro controller, for example. The control circuit 103 is realized by including a semiconductor integrated circuit formed over a semiconductor substrate like single crystal silicon by the well-known CMOS integrated circuit manufacturing technology.

The control circuit 103 performs centralized control of the electric power transmitting device 1. For example, when the non-contact power transmission is performed, the control circuit 103 controls the amplification factor of the transmitting amplifier 102 to adjust the electric power amount to be transmitted. The control unit 103 switches the connection state of the switchable coil 108 through the control of the change-over switch 109, to adjust the resonance frequency of the resonance circuit 110.

Furthermore, the control circuit 103 grasps deviation of the resonance frequency of the resonance circuit 110, on the basis of the reflected amount of the driving signal supplied to the resonance circuit 110 from the transmitting amplifier 102 at the time of the non-contact power transmission, and performs various kinds of control related to the electric power transmission. Although not limited in particular, it is possible to estimate the reflected amount of the driving signal supplied from the transmitting amplifier 102 to the resonance circuit 110, in terms of a voltage standing wave ratio VSWR. For example, the voltage standing wave ratio VSWR is calculated by Equation 2 in the following.

$$VSWR = \frac{(Vi + Vr)}{(Vi - Vr)}$$ [Mathematical 2]

Specifically, the control unit 103 calculates the voltage standing wave ratio VSWR on the basis of the voltage Vi and Vr generated by the power sensing unit 104, and estimates the reflected amount of the driving signal. Then, the control unit 103 performs various kinds of control related to the electric power transmission, on the basis of the estimated reflected amount (the computed value of VSWR) of the driving signal. A concrete content of the control is described later.

<A Configuration of the Electric Power Receiving Device 2>

The electric power receiving device 2 is a small portable device, such as a mobile terminal, for example, and electric charging of a battery VAT by a non-contact power supply is possible. The electric power receiving device 2 is configured, for example, with a receiving coil 121, a resonance capacity 122, a rectifier circuit (RCR_CIR) 123, a voltage regulator circuit (REG_CIR) 124, a charging control circuit (CHGCNT) 125, a control circuit (CNT_CIR) 126, an internal electronic circuit (EC) 127, and a battery VAT.

The receiving coil 121 and the resonance capacity 122 compose a secondary resonance circuit 120, and produce electromotive force (AC signal) by the resonant interaction of the magnetic field generated by the primary resonance circuit 110 of the electric power transmitting device 1. The resonance frequency of the resonance circuit 120 is adjusted to be substantially equal to the electric power transmission frequency fTx; as a result, it is possible to receive efficiently the magnetic field from the electric power transmitting device 1.

The rectifier circuit 123 converts into a DC voltage an AC voltage generated by the electric power received by the resonance circuit 120. The rectifier circuit 123 is a full wave rectifying circuit, for example, and is configured with a diode bridge circuit, for example. The voltage regulator circuit 124 converts into a fixed voltage of desired magnitude the voltage converted into the DC voltage by the rectifier circuit 123. The voltage regulator circuit 124 is a DC/DC converter, for example, and is configured with a step-down switching regulator, a series regulator (LDO: Low drop out), etc.

The voltage generated by the voltage regulator circuit 124 is supplied as a power supply voltage of each functional section of the electric power receiving device 2. For example, the internal electronic circuit 127, the charging control circuit 125, and the battery VAT are illustrated in FIG. 1 as a load circuit 128 coupled to the output terminal of the voltage regulator circuit 124.

The internal electronic circuit 127 is an electronic circuit for realizing the characteristic function as the electric power receiving device 2 (for example, when the electric power receiving device 2 is a mobile phone, the characteristic function is the function expected as the mobile phone). The battery VAT is a secondary battery to which electric charging is possible by the DC voltage generated by the voltage regulator circuit 124. Although not restricted in particular, the battery VAT is a battery of one cell (4.0-4.2 V), for example, such as a lithium-ion battery. The charging control circuit 125 controls electric charging of the battery VAT using the DC voltage generated by the voltage regulator circuit 124. For example, by monitoring the charge current of the battery VAT and the terminal voltage of the battery VAT, the charging control circuit 125 detects the states of the battery VAT (a full charge capacity, a remaining amount, a charging state, etc.), and controls the execution, halt, etc. of the electric charging. Although not restricted in particular, the charging control circuit 125 is a semiconductor integrated circuit, such as a micro controller, which is formed over a semiconductor substrate like single crystal silicon, by the well-known CMOS integrated circuit manufacturing technology.

The control circuit 126 performs centralized control of the electric power receiving device 2. For example, the control circuit 126 performs operation control (enabling control) of the voltage regulator circuit 124, or control of the execution and halt of the charge control over the battery VAT by the charging control circuit 125.

The resonance circuit 120 described above is coupled in series with the rectifier circuit 123 in the latter stage which has the input impedance of about 20-30Ω; therefore, the resonance circuit 120 has a smaller Q value than the resonance circuit 110 of the electric power transmitting device 1. Accordingly, even if the resonance frequency of the resonance circuit 120 of the electric power receiving device 2 deviates by entering of a foreign substance, etc., the deviation width becomes smaller than the deviation width of the resonance frequency of the electric power transmitting device. Therefore, it is easier to adjust the resonance frequency compared with the electric power transmitting device 1. As illustrated in FIG. 1, by configuring the resonance circuit 120 with a series resonant circuit in which the receiving coil 121 and the resonance capacity 122 are coupled in series, it becomes easy to establish impedance matching with the subsequent-stage circuit; accordingly, it becomes unnecessary to provide separately a matching circuit in the latter stage of the resonance circuit 120. Even if a matching circuit is provided in the latter stage of the resonance circuit 120 in order to improve the property furthermore, it is possible to realize the matching circuit by a simple circuit configuration. Accordingly, it is possible to attain the reduction in size of the electric power receiving device 2.

<Details of the Switchable Coil 108>

Here, the switchable coil 108 in the electric power transmitting device 1 is explained in detail.

As described above, the switchable coil 108 can change the connection state of both ends thereof. For example, a change-over switch 109 is coupled between one end and the other end of the switchable coil 108, and by setting the change-over switch 109 to "ON" or "OFF", both ends of the switchable coil 108 are set in a connected state (Short) or a disconnected state (Open). Although not restricted in particular, the switchable coil 108 has the number of turns of one turn, for example.

Figure 2:
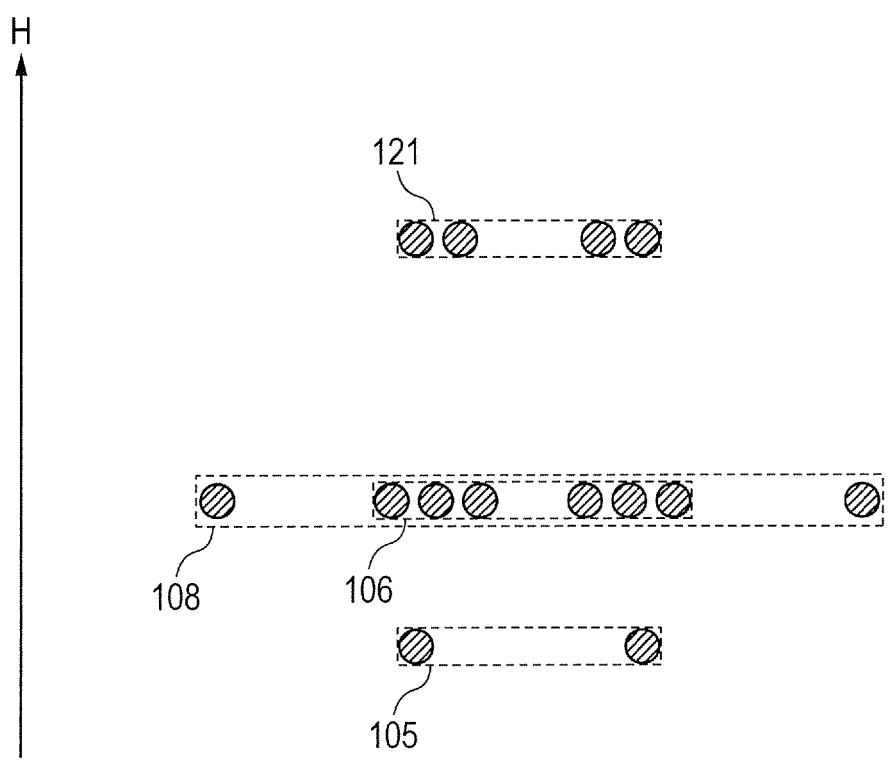
FIG. 2 is a drawing illustrating the positional relationship of each coil in the electric power transmitting device according to Embodiment 1.

FIG. 2 illustrates the positional relationship of each coil in the non-contact power supply system according to Embodiment 1. FIG. 2 illustrates schematically a cross section along a line X-X' in FIG. 1.

As illustrated in FIG. 2, the resonance coil 106 and the electric power supply coil 105 in the electric power transmitting device 1 are arranged so as to have an overlapping part in the height direction H of the electric power transmitting device 1. The switchable coil 108 is arranged in the same plane (in the direction perpendicular to the height direction H) as the resonance coil 106, surrounding the resonance coil 106 (in the exterior of the resonance coil 106). The receiving antenna 121 of the electric power receiving device 2 is arranged above the resonance coil 106 at the time of electric power supply, for example. FIG. 2 illustrates the case where the switchable coil 108 is arranged in the same plane as, and in the exterior of, the resonance coil 106. However, as far as the resonance coil 106 and the switchable coil 108 are coupled magnetically, the arrangement of the switchable coil 108 is not restricted to the arrangement illustrated in the figure. For example, the switchable coil 108 may be arranged in the H direction (in the upper position or in the lower position) to the resonance coil 106.

By switching between the connection states (connected or disconnected) of both ends of the switchable coil 108, it becomes possible to change the resonance frequency of the resonance circuit 110. For example, when both ends of the switchable coil 108 are disconnected at the time of the electric power transmission, electric current does not flow through the switchable coil 108; accordingly, the influence of the switchable coil 108 on the resonance coil 106 can be ignored. On the other hand, when both ends of the switchable coil 108 are connected at the time of the electric power transmission, electric current flows through the switchable coil 108 since the switchable coil 108 couples with the magnetic flux of the resonance coil 106. This electric current generates a magnetic flux emanating from the switchable coil 108, and the magnetic flux acts in the direction which reduces the magnetic flux of the resonance coil 106. As a result, the self-inductance of the resonance coil 106 decreases, causing the resonance frequency of the resonance circuit 110 to change to the direction of a higher frequency.

Figure 3:
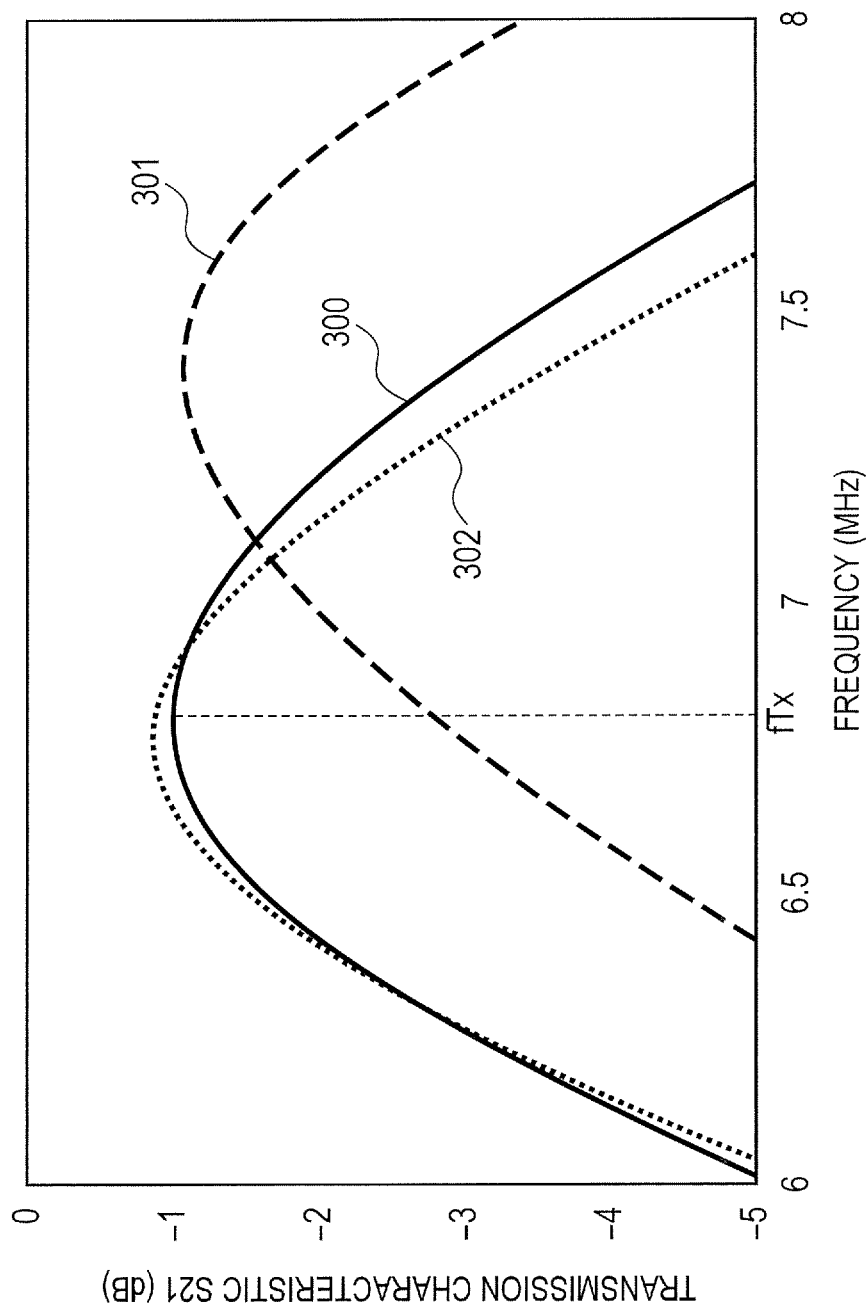
FIG. 3 is a drawing illustrating transmission characteristics when a deviation of a resonance frequency is compensated by means of a switchable coil.

FIG. 3 illustrates transmission characteristics when a deviation of the resonance frequency is compensated by means of the switchable coil 108. In the figure, the horizontal axis expresses a frequency in MHz and the vertical axis expresses a transmission characteristic S21 in dB. FIG. 3 illustrates the transmission characteristic, assuming that the size of the electric power transmitting coil is 12 cm×8 cm, the size of the switchable coil is of the nearly same size, the number of turns of the switchable coil 108 is one turn, the size of the receiving coil 121 is 6 cm×4 cm, and the electric power transmission frequency fTx is 6.78 MHz. The peak points of the transmission characteristics marked with reference symbols 300-302 indicate the resonance frequency of the resonance circuit 110 in the respective characteristics.

In FIG. 3, the reference symbol 300 illustrates the transmission characteristic when the resonance frequency of the resonance circuit 110 is adjusted to the electric power transmission frequency fTx (6.78 MHz), by connecting the switchable coil 108, in the state where the electric power receiving device 2 is not placed in the power transmission area of the electric power transmitting device 1 (the state where the influence of the housing of the electric power receiving device 2 can be ignored). The reference symbol 301 illustrates the transmission characteristic when the switchable coil 108 is connected, in the state where the electric power receiving device 2 is placed near the electric power transmitting device 1 (the state where the influence of the housing of the electric power receiving device 2 cannot be ignored). The reference symbol 302 illustrates the transmission characteristic when the switchable coil 108 is disconnected, in the state where the electric power receiving device 2 is placed near the electric power transmitting device 1.

For example, as illustrated by the reference symbol 300, it is assumed that, in the state where the influence of the housing of the electric power receiving device 2 can be ignored, the change-over switch 109 is set to "ON" to connect the switchable coil 108, and that the resonance frequency of the resonance circuit 110 is adjusted to the electric power transmission frequency fTx (6.78 MHz). In the present state, when the electric power receiving device 2 is placed near the electric power transmitting device 1, the self-inductance of the resonance coil 106 decreases under the influence of the metal part of the housing of the electric power receiving device 2, and the resonance frequency moves to the higher frequency region as illustrated by the reference symbol 301. Accordingly, the change-over switch 109 is set to "OFF", to disconnect the switchable coil 108. With the present operation, the self-inductance of the resonance coil 106 increases, and the resonance frequency moves to the lower frequency region as illustrated by the reference symbol 302. In this way, by switching the connection state of the switchable coil 108, it becomes possible to bring again the resonance frequency, which has deviated when the electric power receiving device 2 is placed near the electric power transmitting device 1, close to the electric power transmission frequency fTx.

<A Process Flow of Transmission Control in the Non-Contact Power Supply System 3>

The flow of processing of the transmission control in the non-contact power supply system according to Embodiment 1 is explained in detail, with reference to FIG. 4.

FIG. 4 is a flow chart illustrating an example of a flow of the transmission control in the non-contact power supply system 3. In FIG. 4, it is assumed that the constants of the resonance coil 106 and the resonance capacity 107 are set in advance so as to match the resonance frequency of the resonance circuit 110 with the electric power transmission frequency fTx, when the electric power transmitting device 1 connects the switchable coil 108 in the state where the influence of the housing of the electric power receiving device 2 can be ignored.

For example, when the power of the electric power transmitting device 1 is switched on and the electric power transmitting device 1 becomes ready to operate, processing related to the transmission control starts (S101). First, in the electric power transmitting device 1, the control unit 103 sets the change-over switch 109 to "ON" to connect the switchable coil 108 (S102). Accordingly, when there is neither the electric power receiving device 2 nor a foreign substance in the neighborhood of the electric power transmitting device 1, the resonance frequency of the resonance circuit 110 coincides substantially with the electric power transmission frequency fTx.

Next, the electric power transmitting device 1 starts the electric power transmission with electric power lower than normal (S103). Specifically, the control unit 103 changes the amplification factor of the transmitting amplifier 102 so that the electric power amount is set lower than the electric power amount of the normal transmission. According to the present method, even when a foreign substance exists in the power transmission area of the electric power transmitting device 1 at the time of Step S102, it is possible to reduce an adverse affect exerted on the foreign substance, and hence, it is possible to enhance the reliability of the transmission control in the non-contact power transmission system.

The electric power transmitting device 1 transmits the electric power amount lower than the normal transmission, and concurrently measures a voltage Vi corresponding to an incident electric power, and a voltage Vr corresponding to a reflected electric power, to calculate a voltage standing wave ratio VSWR by means of the control unit 103 (S104). Then, the electric power transmitting device 1 determines whether there is a change in the value of VSWR (S105). Specifically, the control unit 103 determines whether the value of VSWR calculated in Step S104 is less than the reference value set up in advance, or, the control unit 103 determined whether the value of VSWR calculated in Step S104 is deviated from the value of VSWR measured in the past. In this way, by detecting the existence or nonexistence of a change of the reflected amount, it is possible to detect easily the fact that the electromagnetic field condition in the neighborhood of the electric power transmitting device 1 has changed, that is, the fact that the electric power receiving device 2 or a foreign substance has been placed near the electric power transmitting device 1.

When there is no change in the value of VSWR, the control unit 103 continues the electric power transmission with electric power lower than normal (S103). When there is a change in the value of VSWR, there in a possibility that the electric power receiving device 2 has been placed in the power transmission area of the electric power transmitting device 1. Therefore, the control unit 103 determines whether the value of VSWR is within the prescribed range set up in advance (S106). For example, it is grasped in advance how much the value of VSWR changes when the electric power receiving device 2 is placed in the power transmission area of the electric power transmitting device 1, by experiment, etc. in the manufacturing stage of the electric power transmitting device 1. On the basis of the result of the experiment, etc., the prescribed range used as a determination criterion is set to the electric power transmitting device 1.

When it is determined that the value of VSWR is out of the prescribed range in Step S106, the control unit 103 in the electric power transmitting device 1 determines that a foreign substance has entered into the power transmission area and notifies error information externally (S107). After the notice of the error information, the electric power transmitting device 1 stops the electric power transmission and terminates the electric power transmitting (S108). On the other hand, when the value of VSWR is within the prescribed range, it is determined that the electric power receiving device 2 has been place in the power transmission area of the electric power transmitting device 1, and the control unit 103 makes the electric power transmission start with the normal electric power (S109). Specifically, the control unit 103 changes the amplification factor of the transmitting amplifier 102 so that the electric power amount is larger than the electric power amount set up in Step 105. In this way, by determining the amount of change of the VSWR, it is possible to determine whether the electric power receiving device 2 has been placed in the power transmission area or a foreign substance has entered into the power transmission area.

The control unit 103 in the electric power transmitting device 1 transmits the normal electric power, and concurrently calculates the voltage standing wave ratio VSWR in the state where the switchable coil 108 is connected (S110). Subsequently, the control unit 103 sets the change-over switch 109 to "OFF" to disconnect the switchable coil 108 (S111). Next, the control unit 103 calculates the voltage standing wave ratio VSWR in the state where the switchable coil 108 is disconnected (S112). Then, the control unit 103 compares the value of VSWR in the state where the switchable coil 108 is connected, with the value of VSWR in the state where the switchable coil 108 is disconnected (S113). As the result of the comparison, when the value of VSWR in the state where the switchable coil 108 is disconnected is smaller, the control unit 103 continues the electric power transmission with the electric power in the state where the switchable coil 108 is disconnected (S115). On the other hand, when the value of VSWR in the state where the switchable coil 108 is disconnected is larger, the control unit 103 sets the change-over switch 109 to "ON" to connect the switchable coil 108 (S114). Then, the control unit 103 continues the electric power transmission with the electric power in the state where the switchable coil 108 is connected (S115).

Subsequently, when the electric power transmission to the electric power receiving device 2 has become unnecessary due to the completion of electric charging to the battery VAT in the electric power receiving device 2 or due to other reasons, the electric power transmitting device 1 stops the electric power transmission, and terminates the transmission control (S116).

According to the above-described process flow, it is possible to transmit the electric power by selecting the state where deviation of the resonance frequency on the transmitting side from the transmission frequency fTx becomes smaller. Therefore, it is possible to improve the transmission efficiency of electric power.

In the process flow illustrated in FIG. 4, it is also preferable to perform control which switches between the connection states of the switchable coil 108, without performing the processing (S113) which compares the VSWRs in the connected state and in the disconnected state of the switchable coil 108. For example, the switchable coil 108 is set connected in advance as the initial state. When it is determined that the electric power receiving device 2 has been placed in the neighborhood, the switchable coil 108 is disconnected to shift the resonance frequency to a lower frequency. According to the present method, when the resonance frequency deviates to a higher frequency due to the approach of the electric power receiving device 2, it is possible to compensate easily the deviation of the resonance frequency. That is, it becomes possible to compensate the deviation of the resonance frequency by simpler control.

As described above, according to the electric power transmitting device 1 according to Embodiment 1, it is possible to compensate the deviation of the resonance frequency from the electric power transmission frequency fTx, by connecting or disconnecting both ends of the switchable coil 108. According to the electric power transmitting device 1, it is possible to reduce the electric power loss accompanying the addition of the adjusting function of the resonance frequency, and possible to suppress the increase of the circuit scale of the electric power transmitting device 1, compared with the case where a variable impedance circuit is provided in series to a resonance coil as disclosed by Patent Literature 1. That is, according to the electric power transmitting device 1, it becomes possible to improve the transmission efficiency of the electric power, suppressing the circuit scale.

Embodiment 2

Figure 5:
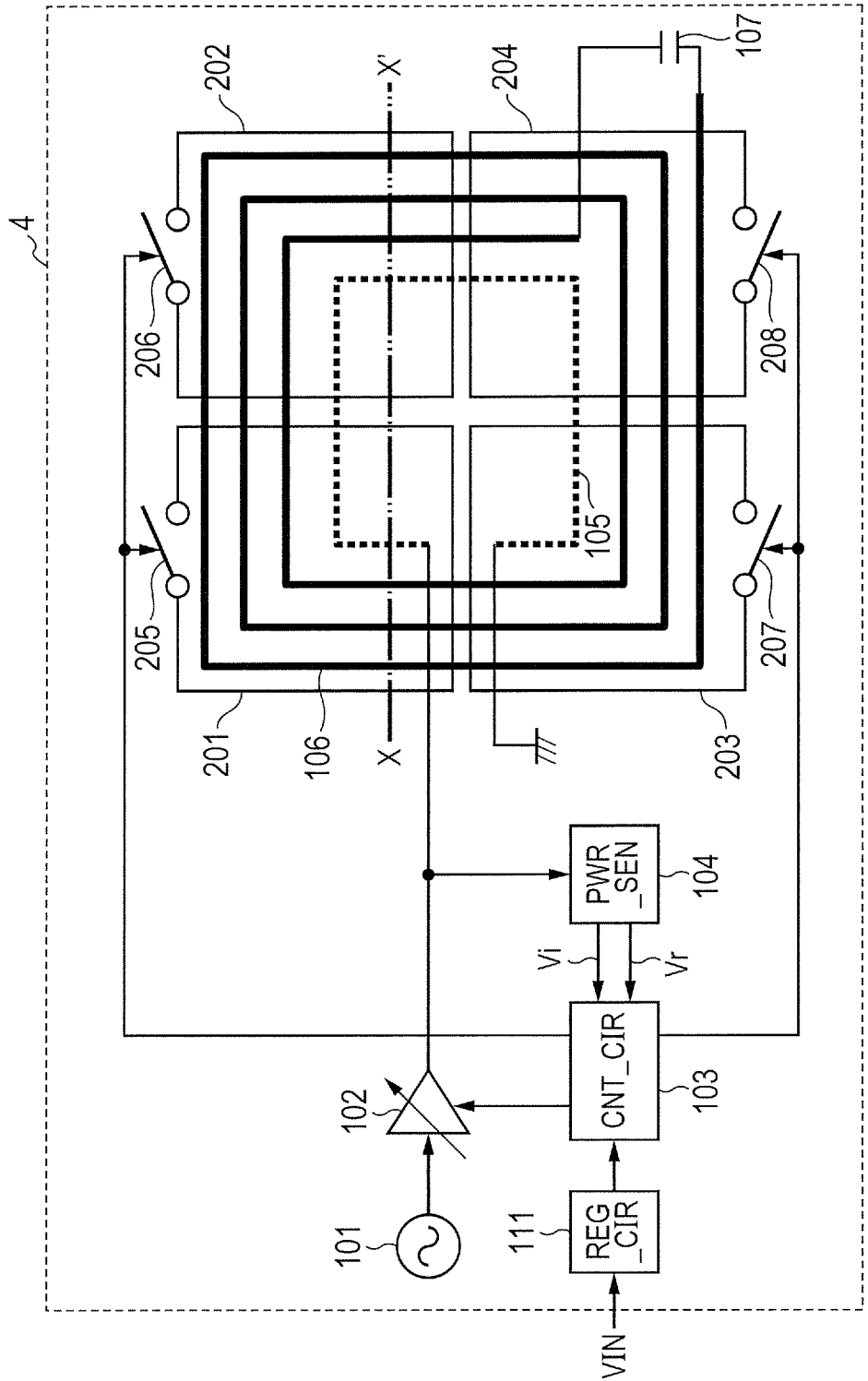
FIG. 5 is a drawing illustrating an electric power transmitting device according to Embodiment 2.

FIG. 5 illustrates an electric power transmitting device according to Embodiment 2.

The electric power transmitting device 4 illustrated in FIG. 5 is different from the electric power transmitting device 1 according to Embodiment 1 in the point that plural switchable coils are provided for adjusting the resonance frequency of the resonance circuit 110. In the electric power transmitting device 4 illustrated in FIG. 5, the same symbol is attached to the same component as the electric power transmitting device 1, and the detailed explanation thereof is omitted.

The electric power transmitting device 4 is provided with plural switchable coils. FIG. 5 illustrates the case where the electric power transmitting device 4 is provided with four switchable coils 201-204; however, there is no restriction in particular in the number of switchable coils.

Each of the switchable coils 201-204 can separately control the connection state of connecting or disconnecting both ends thereof. Specifically, a change-over switch 205 is coupled between one end and the other end of the switchable coil 201, and by setting the change-over switch 205 to "ON" or "OFF", both ends of the switchable coil 201 are set in a connected state (Short) or a disconnected state (Open). Similarly, a change-over switch 206 is coupled between one end and the other end of a switchable coil 202, a change-over switch 207 is coupled between one end and the other end of a switchable coil 203, and a change-over switch 208 is coupled between one end and the other end of a switchable coil 204. Each of the change-over switches 205-208 is separately set to "ON" or "OFF." Although not restricted in particular, the switchable coils 201-204 have the number of turns of one turn, for example.

Figure 6:
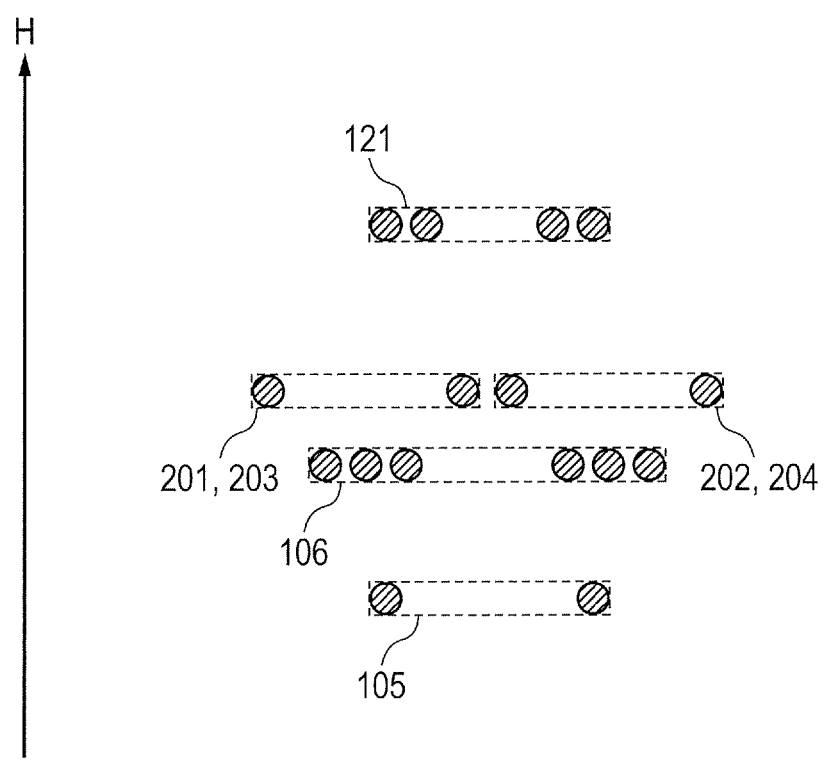
FIG. 6 is a drawing illustrating the positional relationship of each coil in the electric power transmitting device according to Embodiment 2.

FIG. 6 illustrates the positional relationship of each coil in the electric power transmitting device 4 according to Embodiment 2. FIG. 6 illustrates schematically a cross section along a line X-X' in FIG. 5.

As illustrated in FIGS. 5 and 6, each of the switchable coils 201-204 is arranged mutually spaced out in the same plane, so as to overlap with a part of the resonance coil 106 in the height direction H. Each of the switchable coils 201-204 is arranged so as to have a substantially equal overlapping part with the resonance coil 106. For example, as illustrated in FIG. 5, the four switchable coils 201-204 are arranged so that the resonance coil 106 is divided into four substantially equal regions.

As illustrated in FIG. 6, the resonance coil 106 and the electric power supply coil 105 in the electric power transmitting device 4 are arranged so as to have an overlapping part in the height direction H of the electric power transmitting device 1. The receiving antenna 121 of the electric power receiving device 2 is arranged above the resonance coil 106 at the time of electric power supply, for example.

By arranging the switchable coils 201-204 in this way, it is possible to make the switchable coils 201-204 be magnetically coupled with the resonance coil 106. FIGS. 5 and 6 illustrate the case where the switchable coils 201-204 are arranged so as to have the substantially equal overlapping part with the resonance coil 106. However, as far as the resonance coil 106 and the switchable coils 201-204 are coupled magnetically, the arrangement of the switchable coils 201-204 is not restricted to the arrangement illustrated in the figure. It is also preferable to arrange the switchable coils 201-204 so as to have an overlapping part mutually in the height direction H, for example.

Next, the flow of processing of the transmission control in the non-contact power supply system including the electric power transmitting device 4 is explained in detail, with reference to FIG. 7.

FIG. 7 illustrates an example of a flow of the transmission control in the non-contact power supply system including the electric power transmitting device 4 according to Embodiment 2. In FIG. 7, it is assumed that the constants of the resonance coil 106 and the resonance capacity 107 are set in advance so as to match the resonance frequency of the resonance circuit 110 with the electric power transmission frequency fTx, when the electric power transmitting device 4 connects the switchable coils 201-204, in the state where the influence of the housing of the electric power receiving device 2 can be ignored.

For example, when the power of the electric power transmitting device 4 is switched on and the electric power transmitting device 4 becomes ready to operate, processing related to the transmission control starts (S101). First, in the electric power transmitting device 4, the control unit 103 sets the change-over switches 205-208 all to "ON" to connect each of the switchable coils 201-204 (S202). Accordingly, when there is neither the electric power receiving device 2 nor a foreign substance in the neighborhood of the electric power transmitting device 4, the resonance frequency of the resonance circuit 110 coincides substantially with the electric power transmission frequency fTx.

Next, the electric power transmitting device 4 starts the electric power transmission with electric power lower than normal (S103). Then, as is the case with the electric power transmitting device 1 according to Embodiment 1, the electric power transmitting device 4 transmits electric power with electric power lower than normal and concurrently calculates the voltage standing wave ratio VSWR. On the basis of the existence or nonexistence of a change of the VSWR, and of the amount of change of the VSWR, the electric power transmitting device 4 determines whether the electric power receiving device 2 has been placed near the electric power transmitting device 4 (S104-S108).

When it is determined that the electric power receiving device 2 has been placed near the electric power transmitting device 4, the electric power transmitting device 4 starts the electric power transmission with the normal electric power (S209). Then, the electric power transmitting device 4 transmits the electric power with the normal electric power, and concurrently calculates a VSWR in all the combination of the connection state of the switchable coils 201-204 (S210). Specifically, the control unit 103 switches "ON" and "OFF" of the change-over switches 205-208 to change the combination of the connection state of the switchable coils 201-204 (for example, a case where the switchable coils 201-204 are all disconnected, a case where the switchable coil 201 is connected and the switchable coils 202-204 are disconnected, and so on), and calculates a VSWR in each combination. When the control unit 103 in the electric power transmitting device 4 has calculated the VSWR of all the combination of the connection state of the switchable coils 201-204, the control unit 103 selects the combination of the connection state of the switchable coils 201-204 with the smallest value among the calculated VSWR (S211). Then, the control unit 103 sets up "ON" and "OFF" of the change-over switches 205-208 as is the selected connection state, and continues the electric power transmission with the normal electric power (S212). Subsequently, when the electric power transmission to the electric power receiving device 2 has become unnecessary due to the completion of electric charging to the battery VAT in the electric power receiving device 2 or due to other reasons, the electric power transmitting device stops the electric power transmission, and terminates the transmission control (S213).

A described above, according to the electric power transmitting device 4 according to Embodiment 2, as is the case with the electric power transmitting device 1 according to Embodiment 1, it is possible to adjust the resonance frequency on the transmitting side by connecting or disconnecting both ends of each of the switchable coils 201-204. Therefore, it becomes possible to improve the transmission efficiency of the electric power, suppressing the circuit scale. Furthermore, by providing plural switchable coils, it becomes possible to narrow the adjustable width of the resonance frequency and to expand the adjustable range of the resonance frequency. Therefore, the adjustment accuracy of the resonance frequency improves further. Especially, as illustrated in FIGS. 5 and 6, by arranging the switchable coils 201-204 so as to have a substantially equal overlapping part with the resonance coil 106, it becomes possible to adjust the resonance frequency more appropriately to the deviation of the resonance frequency due to the position at which the electric power receiving device 2 is placed.

Embodiment 3

The following describes another example of configuration of plural switchable coils for adjusting the resonance frequency on the transmitting side.

Figure 8:
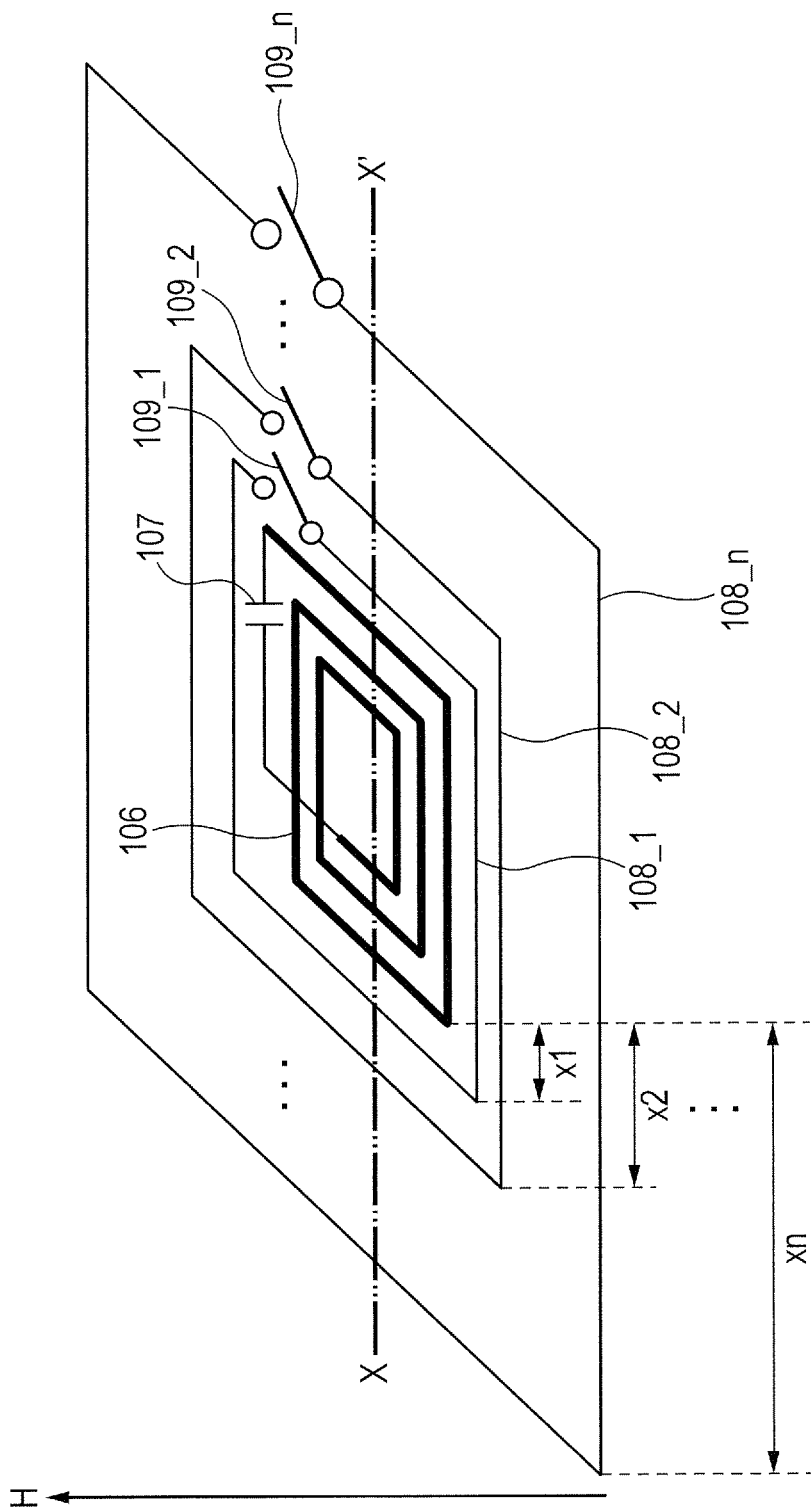
FIG. 8 is a drawing illustrating a configuration example of a switchable coil according to Embodiment 3.

FIG. 8 illustrates a configuration example of a switchable coil according to Embodiment 3.

As illustrated in the figure, plural switchable coils 108_1-108_$n$ ($n$ is an integer equal to or greater than 2) are arranged surrounding the resonance coil 106.

Each of the switchable coils 108_1-108_$n$ can separately control the connection state of connecting or disconnecting both ends thereof. Specifically, a change-over switch 109_1 is coupled between one end and the other end of the switchable coil 108_1, and by setting the change-over switch 109_1 to "ON" or "OFF", both ends of the switchable coil 108_1 are set in a connected state (Short) or a disconnected state (Open). Similarly, a change-over switch 109_2 is coupled between one end and the other end of the switchable coil 108_2, and a change-over switch 109_n is coupled between one end and the other end of the switchable coil 108_n. Each of the change-over switches 109_1-109_n can be separately controlled. Although not restricted in particular, each of the switchable coils 108_1-108_n has the number of turns of one turn, for example.

Figure 9:
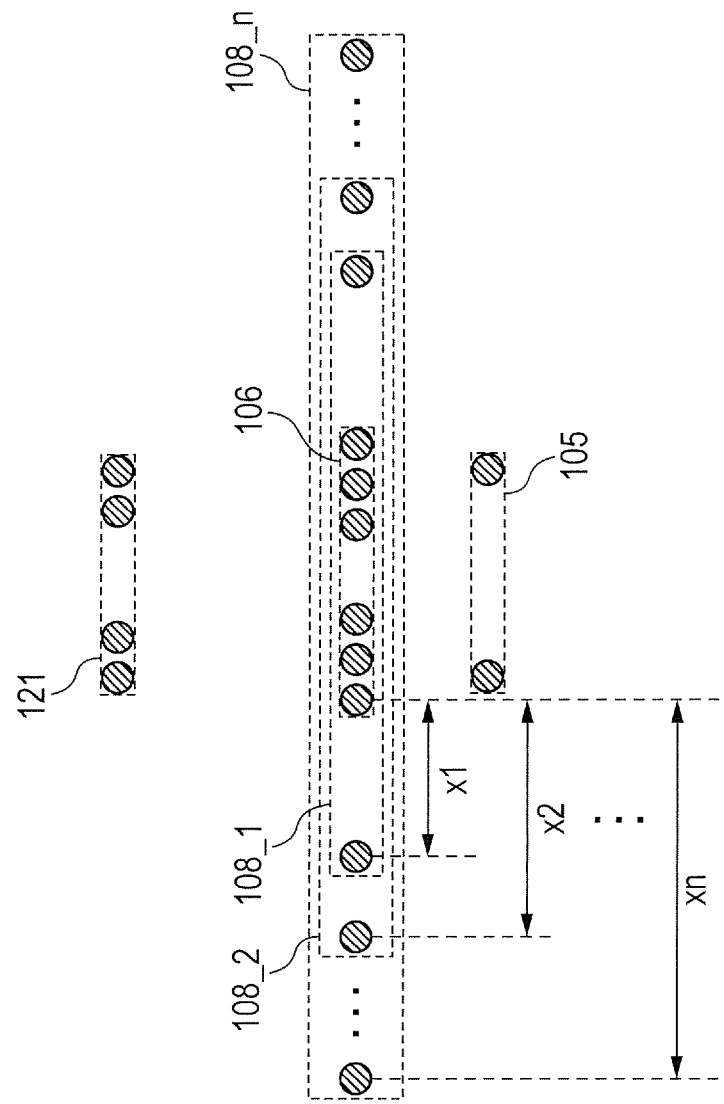
FIG. 9 is a drawing illustrating the positional relationship of the switchable coil with other coils according to Embodiment 3.

FIG. 9 illustrates the positional relationship of the switchable coil with other coils according to Embodiment 3. FIG. 9 illustrates schematically a cross section along a line X-X' in FIG. 8.

As illustrated in FIG. 9, the resonance coil 106 and the electric power supply coil 105 are arranged so as to have an overlapping part in the height direction H, as is the case with the electric power transmitting device 1 according to Embodiment 1. The switchable coils 108_1-108_n are arranged concentrically in the same plane as the resonance coil 106 (in a plane perpendicular to the height direction H), surrounding the resonance coil 106. The receiving antenna 121 of the electric power receiving device 2 is arranged above the resonance coil 106 at the time of electric power supply, for example.

As illustrated in FIGS. 8 and 9, each of the switchable coils 108_1-the 108_n has mutually different length and is arranged concentrically surrounding the resonance coil 106. For example, the switchable coil 108_1 is arranged in the exterior of the resonance coil 106, and the distance between the resonance coil 106 and the switchable coil 108_1 is set to x1. The switchable coil 108_2 is arranged in the exterior of the resonance coil 106 and the switchable coil 108_1, and the distance between the resonance coil 106 and the switchable coil 108_2 is set to x2 (>x1). The switchable coil 108_n is arranged in the exterior of the resonance coil 106 and the switchable coils 108_1-108_n-1, and the distance between the resonance coil 106 and the switchable coil 108_n is set to xn (>x2>x1).

By arranging each of the switchable coils 108_1-108_n at respectively different distance from the resonance coil 106 in this way, it is possible to realize respectively different strength of magnetic coupling between each of the switchable coils 108_1-108_n and the resonance coil 106. Accordingly, it is possible to change the adjustable width of the resonance frequency. Various kinds of control become possible; for example, the resonance frequency can be shifted largely by switching the connection state of the switchable coil 108_1 which is arranged nearest to the resonance coil 106 (having the strongest magnetic coupling with the resonance coil 106), or the resonance frequency can be shifted a little by switching the connection state of the switchable coil 108_n which is furthest from the resonance coil 106 (having the weakest magnetic coupling with the resonance coil 106). Furthermore, it becomes possible to adjust the resonance frequency more finely, by changing variously the combination of the connection state of the switchable coils 108_1-108_n.

For example, in the electric power transmitting device 4 according to Embodiment 2, by providing the switchable coils 108_1-108_n and the change-over switches 109_1-109_n in lieu of the switchable coils 201-204 and the change-over switches 205-208, it is possible to perform the same control as for the switchable coils 201-204 and the change-over switches 205-208. For example, in the process flow illustrated in FIG. 7, the control target in Step S202, Step S210, and Step S211 is set to the switchable coils 108_1-108_n, in lieu of the switchable coils 201-204, and each processing is executed. According to the present method, as is the case with the electric power transmitting device 4 according to Embodiment 2, it becomes possible to improve further the transmission efficiency of the electric power, suppressing the circuit scale.

Embodiment 4

The following describes further another example of configuration of plural switchable coils for adjusting the resonance frequency on the transmitting side.

Figure 10:
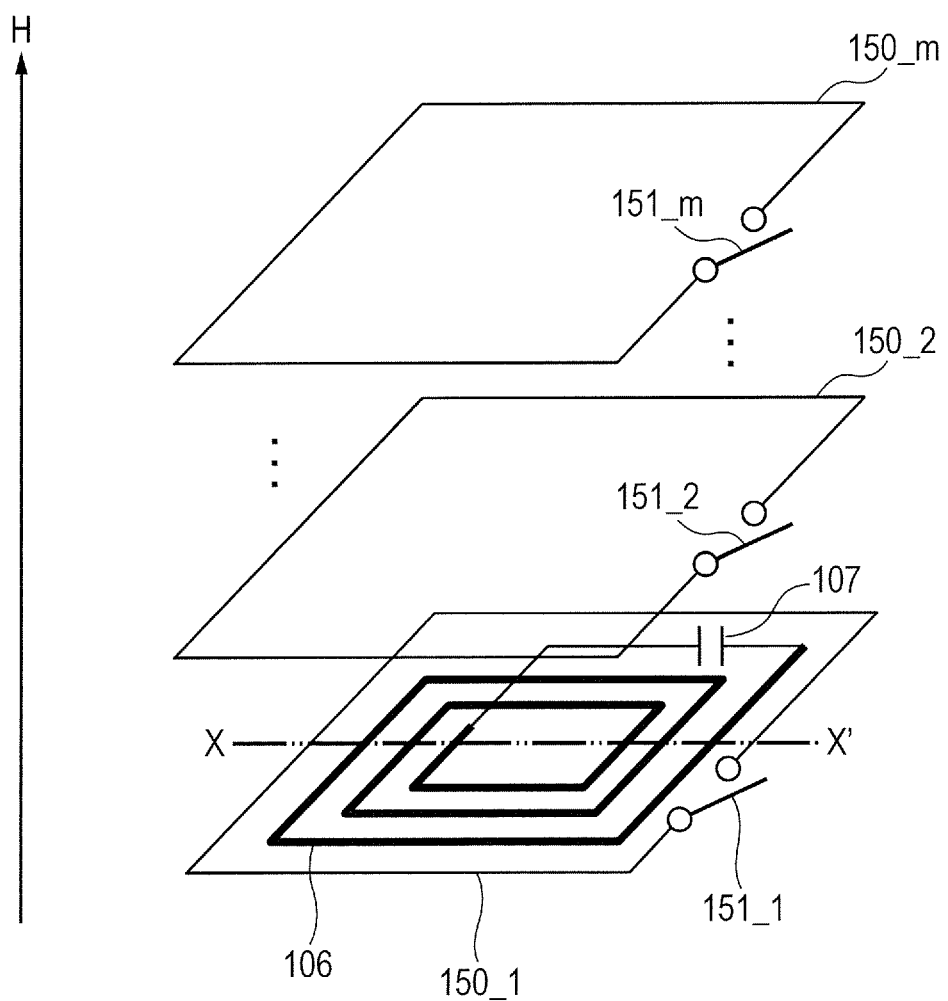
FIG. 10 is a drawing illustrating a configuration example of a switchable coil according to Embodiment 4.

FIG. 10 illustrates a configuration example of a switchable coil according to Embodiment 4.

As illustrated in the figure, plural switchable coils 150_1-150_m (m is an integer equal to or greater than 2) are arranged so as to overlap respectively in the height direction H. Although not restricted in particular, each of the switchable coils 150_2-150_m has substantially equal length and the number of turns of one turn, for example.

Each of the switchable coils 150_1-150_m can separately control the connection state of connecting or disconnecting both ends thereof. Specifically, a change-over switch 151_1 is coupled between one end and the other end of the switchable coil 150_1, and by setting the change-over switch 151_1 to "ON" or "OFF", both ends of the switchable coil 150_1 are set in a connected state (Short) or a disconnected state (Open). Similarly, a change-over switch 151_2 is coupled between one end and the other end of the switchable coil 150_2, and a change-over switch 151_m is coupled between one end and the other end of the switchable coil 150_m. Each of the change-over switches 151_1-151_m can be separately controlled.

Figure 11:
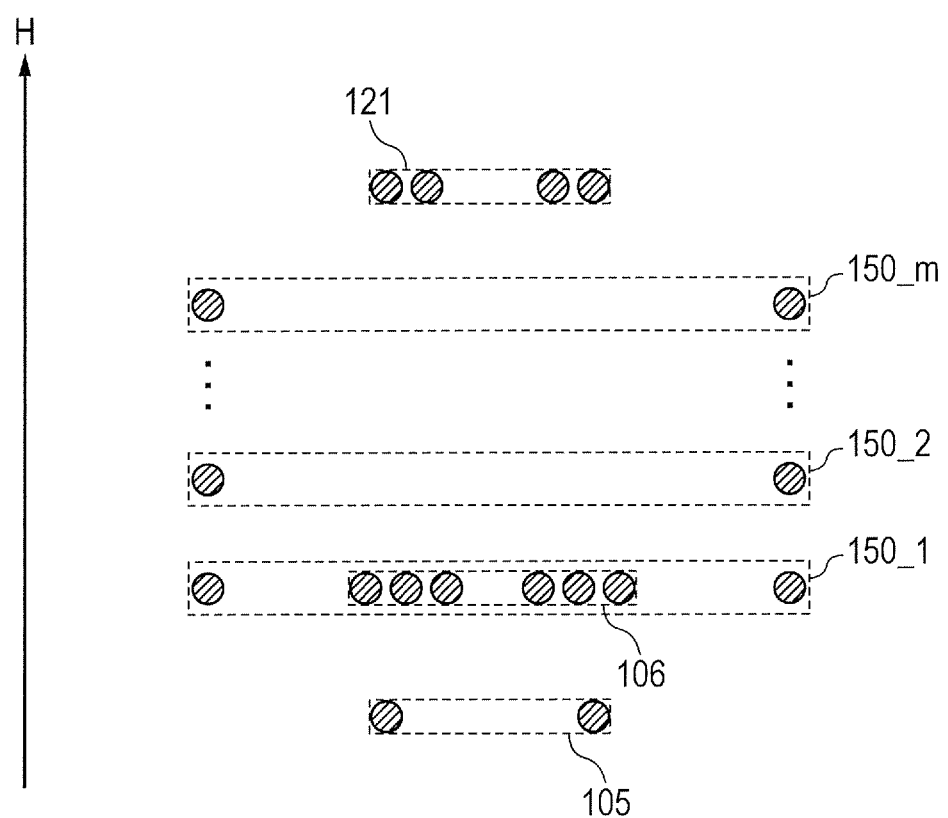
FIG. 11 is a drawing illustrating the positional relationship of the switchable coil with other coils according to Embodiment 4.

FIG. 11 illustrates the positional relationship of the switchable coil with other coils according to Embodiment 4. FIG. 11 illustrates schematically a cross section along a line X-X' in FIG. 10.

As illustrated in the figure, the resonance coil 106 and the electric power supply coil 105 are arranged so as to have an overlapping part in the height direction H, as is the case with the electric power transmitting device 1 according to Embodiment 1. The switchable coil 150_1 is arranged concentrically in the same plane (in the plane perpendicular to the height direction H) as the resonance coil 106, surrounding the resonance coil 106 (in the exterior of the resonance coil 106). Each of the switchable coils 150_2-150_m is arranged mutually spaced out so as to overlap with the switchable coil 150_1 in the height direction H. The distance between each of the switchable coils 150_1-150_m is not restricted in particular. For example, the distance between each of the switchable coils may be rendered equal.

By arranging the switchable coils 150_1-150_m in this way, the strength of magnetic coupling between each of the switchable coils 150_1-150_m and the resonance coil 106 can be rendered mutually different, as is the case with the switchable coils 108_1-108_n according to Embodiment 3. Accordingly, it is possible to change the adjustable width of the resonance frequency. Furthermore, it becomes possible to adjust the resonance frequency more finely, by changing variously the combination of the connection state of the switchable coils 150_1-150_m.

For example, in the electric power transmitting device 4 according to Embodiment 2, by providing the switchable coils 150_1-150_m and the change-over switches 151_1-151_m in lieu of the switchable coils 201-204 and the change-over switches 205-208, it is possible to perform the same control as for the switchable coils 201-204 and the change-over switches 205-208. For example, in the process flow illustrated in FIG. 7, the control target in Step S202, Step S210, and Step S211 is set to the switchable coils 150_1-150_m, in lieu of the switchable coils 201-204, and each processing is executed. According to the present method, as is the case with the electric power transmitting device 4 according to Embodiment 2, it becomes possible to improve further the transmission efficiency of the electric power, suppressing the circuit scale.

Embodiment 5

An electric power transmitting device according to Embodiment 5 is different from the electric power transmitting device according to Embodiments 1 through 4 in the point that a switchable coil for adjusting the resonance frequency on the transmitting side is used as a communications antenna at the time of wireless communications.

Figure 12:
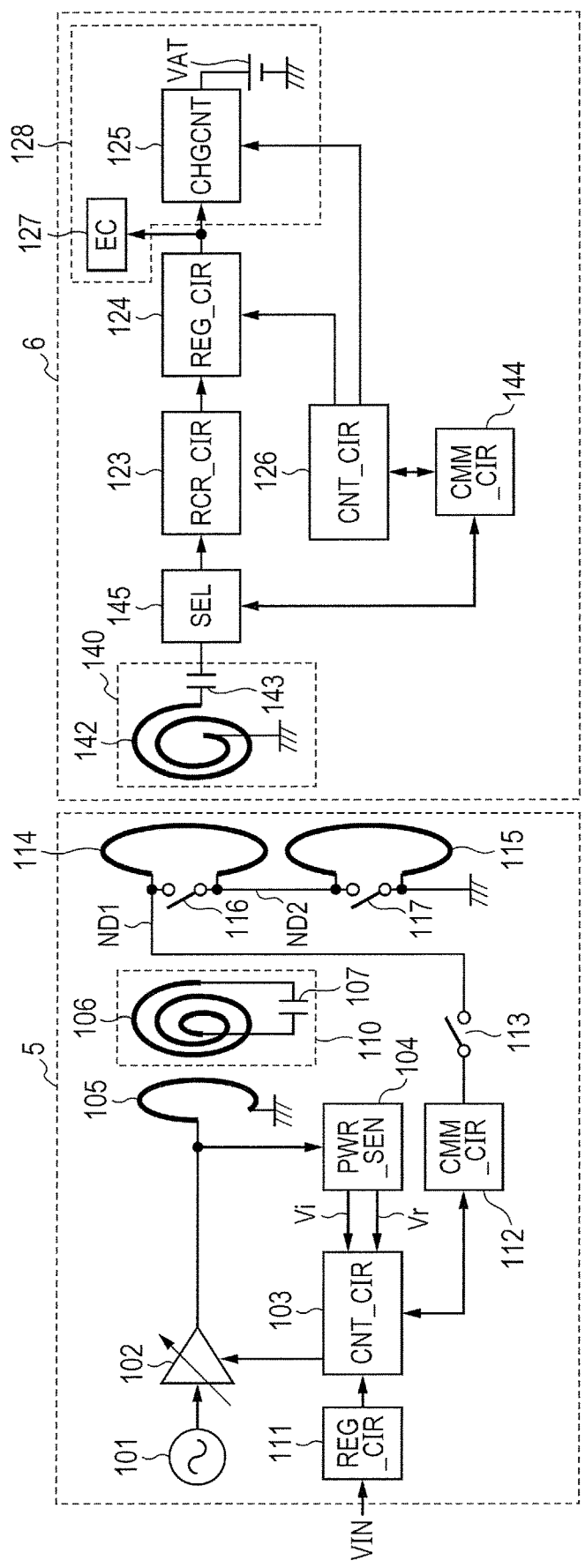
FIG. 12 is a drawing illustrating a non-contact power supply system including an electric power transmitting device according to Embodiment 5.

FIG. 12 illustrates a non-contact power supply system including an electric power transmitting device according to Embodiment 5.

The non-contact power supply system 7 illustrated in the figure includes an electric power transmitting device 5 and an electric power receiving device 6. In addition to the electric power supply in the magnetic resonance type from the electric power transmitting device 5 to the electric power receiving device 6, the non-contact power supply system 7 can perform wireless communications between the electric power transmitting device 5 and the electric power receiving device 6. Although not restricted in particular, the wireless communications concerned is a wireless communications in conformity with the NFC specifications (NFC communications). In the non-contact power supply system 7 illustrated in FIG. 12, the same symbol is attached to the same component as the non-contact power supply system 3 according to Embodiment 1, and the detailed explanation thereof is omitted.

In addition to the components of the electric power transmitting device 1, the electric power transmitting device 5 is provided with a communication unit (CMM_CIR) 112 and a wireless communication switch 113. The electric power transmitting device 5 is provided with switchable coils 114 and 115 and change-over switches 116 and 117 in lieu of the switchable coil 108 and the change-over switch 109.

The communication unit 112 performs wireless communications with the electric power receiving device 6, via the switchable coil 114 or the switchable coil 115. For example, an exchange of the authentication data for authenticating whether the electric power receiving device 6 is an electric power transmission target of the electric power transmitting device 5, an exchange of the reception notice for notifying whether the electric power receiving device 6 has received the electric power transmitted from the electric power transmitting device 5 and others are performed utilizing the present wireless communications. In addition, the exchange of data with the electric power receiving device 6 necessary for control of the non-contact power transmission is performed by the wireless communications by means of the communication unit 112.

The wireless communication switch 113 is coupled between an input-output terminal of the communication unit 112 and a node ND1. The wireless communication switch 113 can be controlled to "ON" or "OFF" by the control unit 103, for example. For example, the wireless communication switch 113 is set to "ON" when the electric power transmitting device 5 communicates via the switchable coils 114 or 115, and the wireless communication switch 113 is set to "OFF" when the electric power transmitting device 5 transmits the electric power.

The switchable coils 114 and 115 have the function as a communications antenna for performing wireless communications, and the function for adjusting the resonance frequency, as is the case with the switchable coil 108 according to Embodiment 1, for example. The switchable coils 114 and 115 are coupled in series between the node ND1 and the ground node. Specifically, one end of the switchable coil 114 is coupled to the node ND1, and the other end is coupled to a node ND2. The change-over switch 116 is coupled between the node ND1 and the node ND2. One end of the switchable coil 115 is coupled to the node ND2, and the other end is coupled to the ground node. The change-over switch 117 is coupled between the node ND2 and the ground node.

Figure 13:
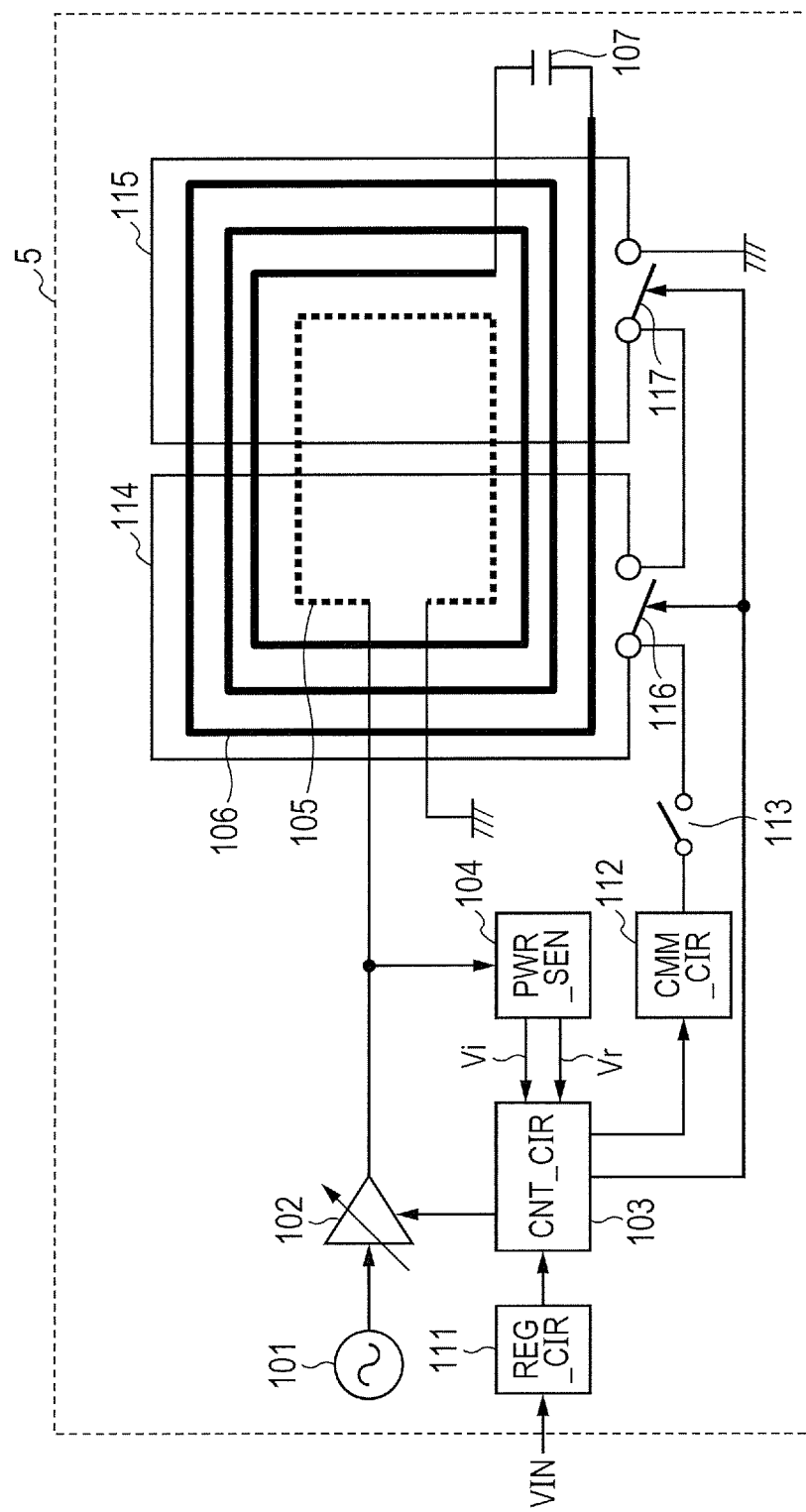
FIG. 13 is a drawing illustrating an example of arrangement of switchable coils 114 and 115 in the plane view in the electric power transmitting device according to Embodiment 5.

FIG. 13 illustrates an example of arrangement of the switchable coils 114 and 115 in the plane view in the electric power transmitting device according to Embodiment 5.

As illustrated in the figure, the resonance coil 106 and the electric power supply coil 105 in the electric power transmitting device 5 are arranged so as to have an overlapping part in the height direction, as is the case with the electric power transmitting device 1. The receiving antenna 121 of the electric power receiving device 2 is arranged above the resonance coil 106 at the time of electric power supply, for example.

The switchable coils 114 and 115 are arranged mutually spaced out in the same plane, so as to overlap with a part of the resonance coil 106 in the height direction (on the upper side of the resonance coil 106). Each of the switchable coils 114 and 115 is arranged so as to have a substantially equal overlapping part with the resonance coil 106. For example, as illustrated in FIG. 13, two switchable coils 114 and 115 are arranged so that the resonance coil 106 may be divided into two substantially equal regions. Although not restricted in particular, each of the switchable coils 114 and 115 has the number of turns of one turn, for example.

By arranging the switchable coils 114 and 115 in this way, it is possible to make the switchable coils 114 and 115 be magnetically coupled with the resonance coil 106. FIG. 13 illustrates the case where the switchable coils 114 and 115 are arranged so as to have the substantially equal overlapping part with the resonance coil 106. However, as far as the resonance coil 106 and the switchable coils 114 and 115 are coupled magnetically, the arrangement of the switchable coils 114 and 115 is not restricted to the arrangement illustrated in the figure. It is also preferable to arrange the switchable coils 114 and 115 so as to have an overlapping part mutually in the height direction H, for example.

The electric power receiving device 6 uses one antenna for the NFC communications and for the electric power reception of the magnetic resonance type. It is possible to switch between the transmission and reception of the electric power and the communication for information transmission. Specifically, in addition to the electric power receiving device 2 according to Embodiment 1, the electric power receiving device 6 is further provided with a resonance circuit 140 which is configured with a receiving coil 142 and a resonance capacity 143, a switching circuit (SEL) 145 coupled to the resonance circuit 140, and a communication unit (CMM_CIR) 144.

The communication unit 144 employs the receiving coil 142 as a communications antenna, to perform wireless communications with the electric power transmitting device 6. Specifically, transmission and reception of the data by the wireless communications via the switchable coils 114 or 115 and the receiving coil 142 as a communications antenna are enabled between the communication unit 112 of the electric power transmitting device 5 and the communication unit 144 of the electric power receiving device 6.

According to the signal level of an AC signal received by the resonance circuit 140, the switching circuit 145 outputs the received signal to either of the communication unit 144 or the rectifier circuit 123. For example, the output of the switching circuit 145 is directed to the communication unit 144 as the initial state, and when a signal having a signal level higher than at the time of the NFC communications, the output of the switching circuit 145 is switched to the rectifier circuit 123.

Here, the flow of processing related to the wireless communications and the electric power transmission in the non-contact power supply system 7 is explained in detail with reference to FIG. 14.

Figure 14:
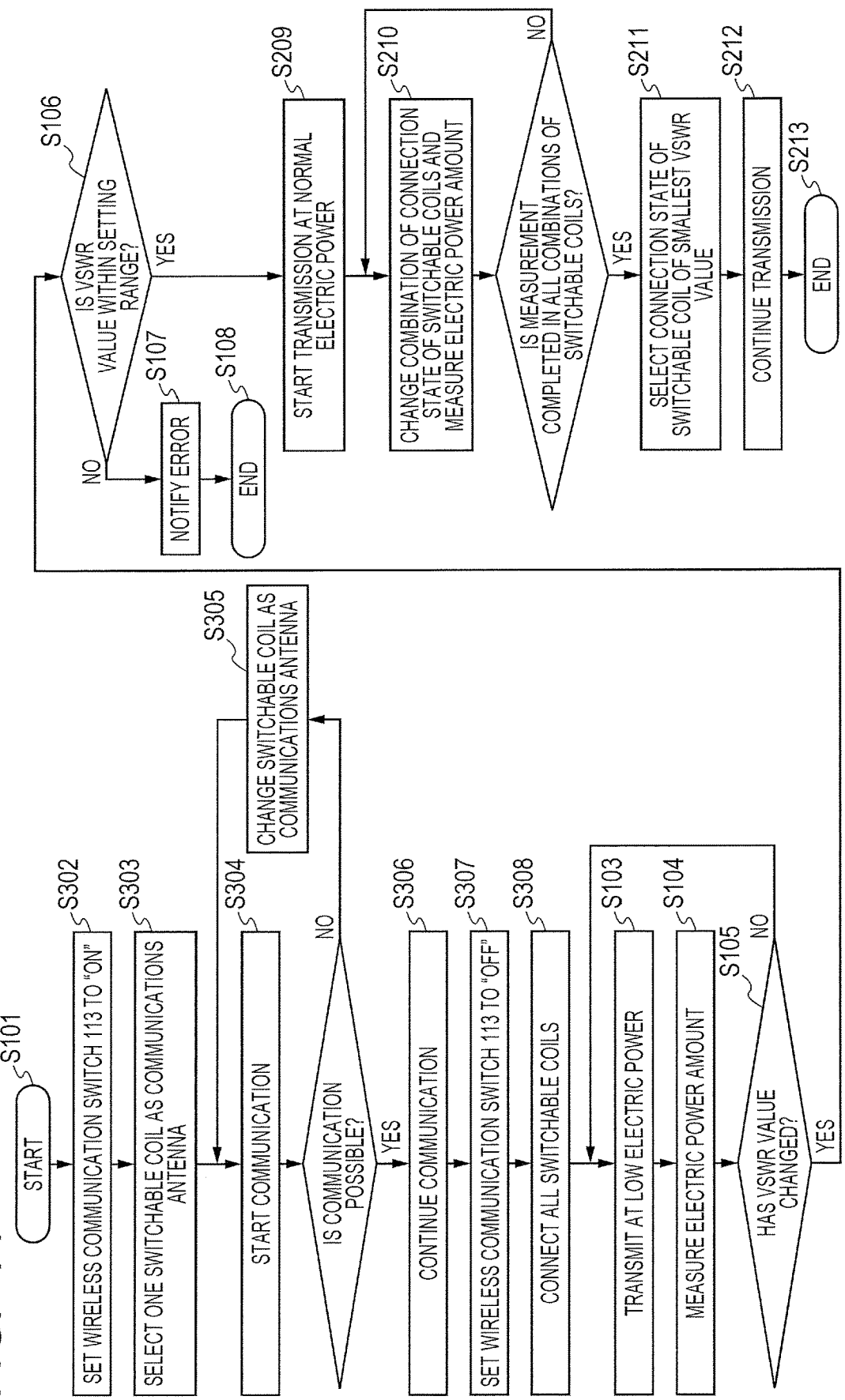
FIG. 14 is a flow chart illustrating a flow of processing of wireless communications and electric power transmission in the non-contact power supply system according to Embodiment 5.

FIG. 14 is a flow chart illustrating a flow of processing of wireless communication and electric power transmission in the non-contact power supply system 7 according to Embodiment 5. In FIG. 14, it is assumed that the constants of the resonance coil 106 and the resonance capacity 107 are set in advance so as to match the resonance frequency of the resonance circuit 110 with the electric power transmission frequency fTx, when the electric power transmitting device 5 connects the switchable coils 114 and 115, in the state where the influence of the housing of the electric power receiving device 6 can be ignored.

For example, when the power of the electric power transmitting device 5 is switched on and the electric power transmitting device 4 becomes ready to operate, processing related to the transmission control starts (S101). First, in the electric power transmitting device 5, the control unit 103 sets the wireless communication switch 113 to "ON", to enable the wireless communications (S302). Next, the electric power transmitting device 5 selects one of the switchable coils 114 and 115 as a communications antenna (S303). For example, the control unit 103 in the electric power transmitting device 5 sets one of the change-over switches 116 and 117 to "ON" and the other to "OFF." Accordingly, one of the switchable coils 114 and 115 is coupled between the node ND1 and the ground node, and it can function as the communications antenna. Accordingly, one of the switchable coils 114 and 115 is coupled with the input-output terminal of the communication unit 112, and the wireless communications by means of the communication unit 112 is enabled.

Next, the electric power transmitting device 5 starts the wireless communications (S304). When the wireless communications cannot be established in spite of having started the wireless communications, the electric power transmitting device 5 switches the communications antenna (S305). For example, when the switchable coil 114 has been selected as the communications antenna in Step 303 (the change-over switch 116 is set to "OFF" and the change-over switch 117 is set to "ON"), the switchable coil 115 is newly selected as the communications antenna (the change-over switch 116 is set to "ON" and the change-over switch 117 is set to "OFF"). Then, the wireless communications is started again (S304). When the wireless communications is established, the electric power transmitting device 5 continues the wireless communications with the electric power receiving devices 6 and exchanges various kinds of data (S306).

In the wireless communications in Step S306, when it is confirmed that the electric power receiving device 6 is an electric power transmission target of the electric power transmitting device 5, the electric power transmitting device 5 starts the transmission control of electric power. First, the control unit 103 in the electric power transmitting device 5 sets the wireless communication switch 113 to "OFF" (S307). Next, the control unit 103 sets to "ON" all the change-over switches 116 and 117, to connect both ends of the switchable coils 114 and 115 (S308). Next, the control unit 103 starts the electric power transmission with electric power lower than normal (S103). Subsequently, as is the case with the process flow (FIG. 7) of the electric power transmitting device 4 according to Embodiment 2, the electric power transmitting device 5 performs the determination processing (S104-S108) of whether the electric power receiving device 6 exists in the power transmission area, and then the electric power transmitting device 5 performs the search processing (S209-S213) for searching the connection state of the switchable coils 114 and 115 which makes the VSWR the smallest. Accordingly, an efficient electric power transmission is realized.

As described above, according to the electric power transmitting device 5 according to Embodiment 5, it is possible to realize the wireless communications by employing the switchable coils 114 and 115, which are originally provided as the adjustment means of the resonance frequency, also as a communications antenna for the wireless communications, without providing an antenna for the wireless communications separately. As described above, it is possible to switch the switchable coils 114 and 115 to be employed as the communications antenna, depending on the quality of the communication condition in the wireless communications. Therefore, it is possible to establish the wireless communications with a more favorable communication condition.

Embodiment 6

An electric power transmitting device according to Embodiment 6 is different from the electric power transmitting device according to Embodiments 1 through 5, in the point that the electric power transmission is enabled by means of a repeating coil magnetically coupled with the resonance coil, in addition to the electric power transmission by means of the resonance coil.

Figure 15:
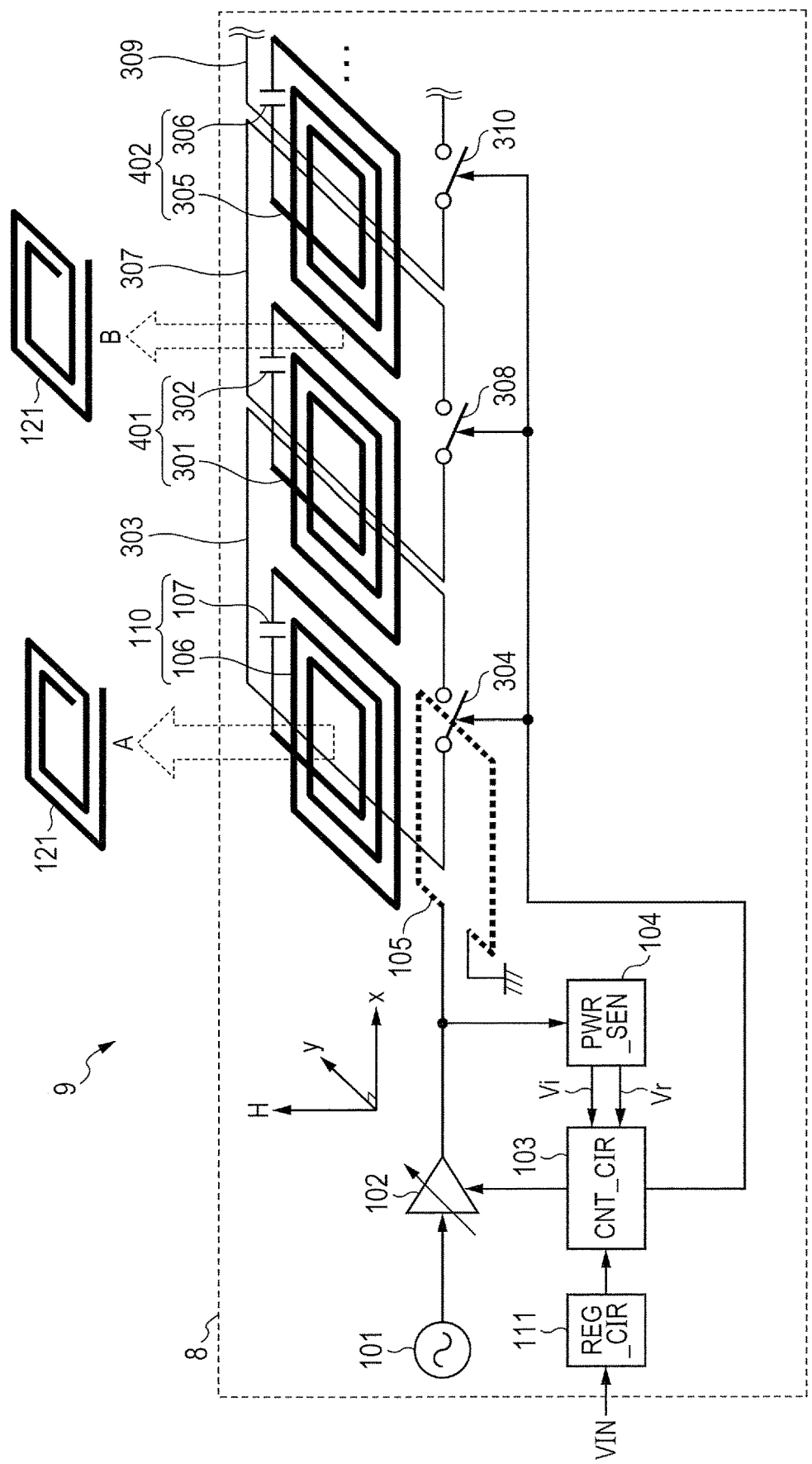
FIG. 15 is a drawing illustrating a non-contact power supply system including an electric power transmitting device according to Embodiment 6.

FIG. 15 illustrates a non-contact power supply system including an electric power transmitting device according to Embodiment 6.

The non-contact power supply system 9 illustrated in the figure includes an electric power transmitting device 8 and an electric power receiving device 2. In the non-contact power supply system 9 illustrated in FIG. 15, the same symbol is attached to the same component as the non-contact power supply system 3 according to Embodiment 1, and the detailed explanation thereof is omitted. For convenience of explanation, only the receiving coil 121 is shown as the electric power receiving device 2 in the figure, and other circuit blocks are not shown.

As is the case with the electric power transmitting device 1 according to Embodiment 1, the electric power transmitting device 8 is configured with an oscillator 101, a transmitting amplifier 102, a control circuit 103, a power sensing unit 104, an electric power supply coil 105, a resonance coil 106, and a resonance capacity 107. The electric power transmitting device 8 is configured further with plural repeating circuits composed of a repeating coil and a resonance capacity, and plural switchable coils and plural change-over switches. FIG. 15 illustrates, as an example, a repeating circuit 401 including a repeating coil 301 and a resonance capacity 302 and a repeating circuit 402 including a repeating coil 305 and a resonance capacity 306. FIG. 15 also illustrates a switchable coil 303 and a change-over switch 304, a switchable coil 307 and a change-over switch 308, and a switchable coil 309 and a change-over switch 310.

The repeating coil 301 is arranged magnetically coupled with the resonance coil 106, and the resonance capacity 302 is coupled to both ends thereof. The repeating coil 305 is arranged magnetically coupled with the repeating coil 301, and the resonance capacity 306 is coupled to both ends thereof. The resonance coil 106 and the repeating coils 301 and 305 are arranged side by side on the same plane in the electric power transmitting device. FIG. 15 illustrates the case where the resonance coil 106 and the repeating coils 301 and 305 are arranged in a line along the x direction. However, they may be arranged in a line along the y direction or they may be arranged along both the x direction and the y direction. With these configurations, the adjoining coils are coupled magnetically.

The constants of the resonance coil 106 and the resonance capacity 107 are set so as to match the resonance frequency of the resonance circuit 110 with the electric power transmission frequency fTx. Accordingly, the electric power of the electric power supply coil 105 is transmitted to the resonance coil 106 efficiently. Also in the repeating circuit 401, the constants of the repeating coil 301 and the resonance capacity 302 are set so as to match the resonance frequency to the electric power transmission frequency fTx. Much the same is true on the repeating circuit 402. With the present configuration, it is possible to transmit the electric power of the electric power supply coil 105 efficiently to the resonance coil 106, the repeating coil 301, and the repeating coil 305, in this order. In such a state, when the receiving coil 121 with the same resonance frequency is placed near to the upper side (in the height direction H) of these coils, the receiving coil 121 receives the electric power efficiently. For example, in FIG. 15, when the receiving coil 121 is placed in the position indicated by a reference symbol A, the receiving coil 121 can receive the electric power efficiently from the resonance coil 106.

However, the inventors of the present invention have found that, when the receiving coil 121 of the electric power receiving device 2 is placed in the boundary area of the coils arranged in a line in the electric power transmitting device, it is likely that a sufficient electric power may not be transmitted to the electric power receiving device 2. This is because there exists in the boundary area a place (null point) where the magnetic flux of one of two adjoining coils and the magnetic flux of the other cancel out. For example, as illustrated in FIG. 15, when the receiving coil 121 is placed in the boundary area (the position indicated by a reference symbol B) of the repeating coil 301 and the repeating coil 305, it is likely that the receiving coil 121 cannot receive a sufficient electric power due to the presence of a null point. Accordingly, the electric power transmitting device 8 according to the present embodiment arranges switchable coils 303, 307, and 309 in the boundary areas of the coils, respectively.

The switchable coil 303 is arranged magnetically coupled with both the resonance coil 106 and the repeating coil 301. For example, as illustrated in FIG. 15, the switchable coil 303 is arranged in the boundary area of the resonance coil 106 and the repeating coil 301, so as to have an overlapping part with both the resonance coil 106 and the repeating coil 301 in the height direction H. Similarly, the switchable coil 307 is arranged in the boundary area of the repeating coil 301 and the repeating coil 305, so as to have an overlapping part with both coils in the height direction H. The switchable coil 309 is arranged in the boundary area of the repeating coil 305 and the adjoining repeating coil (not shown), so as to have an overlapping part with both coils in the height direction H. Although not restricted in particular, the switchable coils 303, 307, and 309 have the number of turns of one turn, for example.

The switchable coils 303, 307, and 309 can control respectively the connection state of connecting or disconnecting both ends thereof. Specifically, a change-over switch 304 is coupled to both ends of the switchable coil 303, and by controlling "ON" and "OFF" of the change-over switch 304 by means of the control unit 103, switching between the connection and the disconnection of the switchable coil 303 is enabled. Similarly, a change-over switch 308 is coupled to both ends of the switchable coil 307, a change-over switch 310 is coupled to both ends of the switchable coil 309, and "ON" and "OFF" of the change-over switches 308 and 310 are controlled by means of the control unit 103.

The concrete control method of the switchable coils is as follows. First, both ends of the switchable coils 303, 307, and 309 are disconnected as the initial state. When the receiving coil 121 has been placed in the boundary area of the resonance coil 106 and repeating coils 301 and 305, etc., both ends of the corresponding switchable coil are connected. For example, in FIG. 15, when the receiving coil 121 is placed in the boundary area (the position indicated by the reference symbol B) of the repeating coil 301 and the repeating coil 305, both ends of the switchable coil 307 are connected. Accordingly, the electromagnetic field condition in the neighborhood of the boundary area changes. Therefore, the place of the null point to appear changes and a possibility that the receiving coil 121 can receive the electric power efficiently becomes high.

Figure 16:
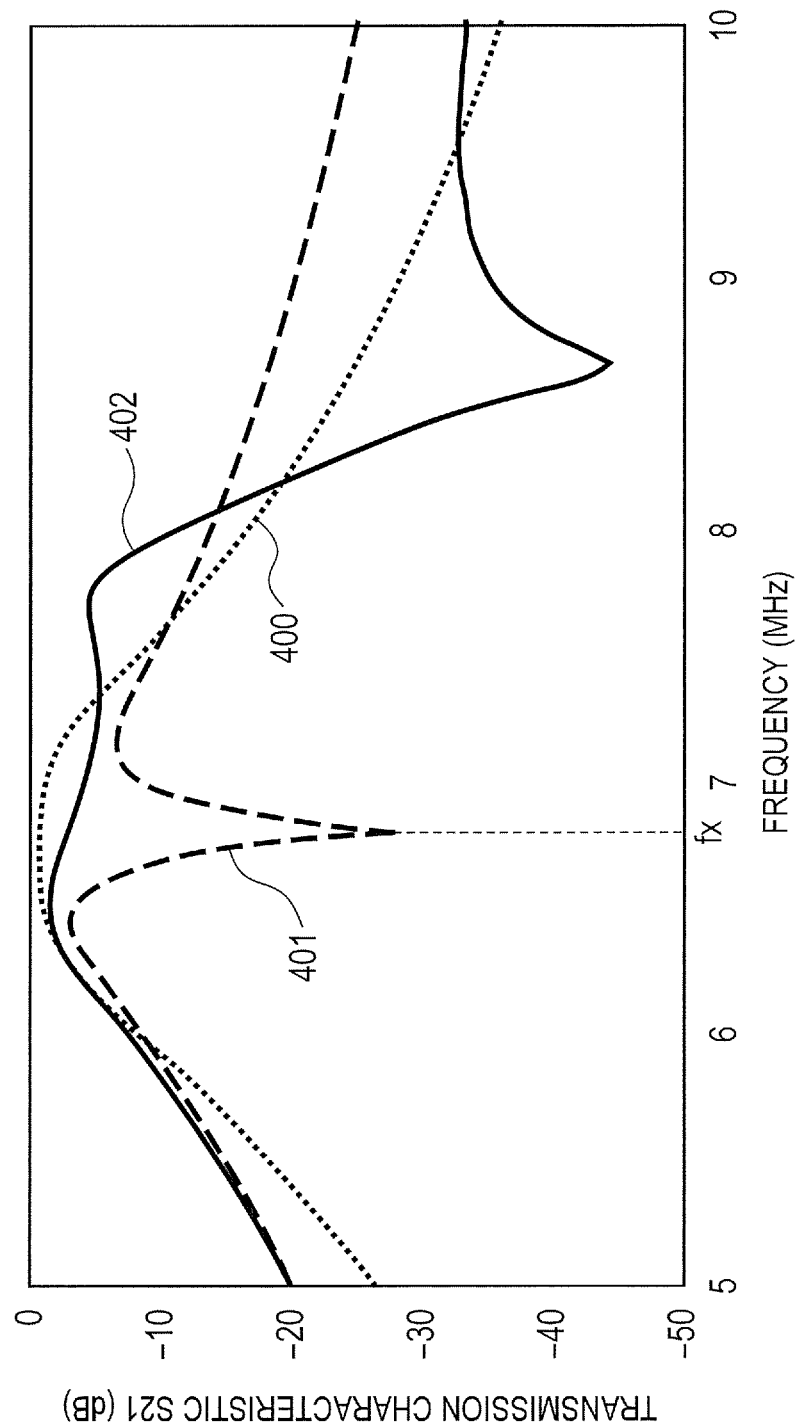
FIG. 16 is a drawing illustrating transmission characteristics when switching control of connection or disconnection of a switchable coil is performed.

FIG. 16 illustrates transmission characteristics when switching control of connection or disconnection of a switchable coil is performed. In the figure, the horizontal axis expresses a frequency in MHz and the vertical axis expresses a transmission characteristic S21 in dB. A reference symbol 400 illustrates transmission characteristics when the electric power receiving device 2 (the receiving coil 121) is placed in the position indicated by the reference symbol A of FIG. 15. A reference symbol 401 illustrates transmission characteristics when the electric power receiving device 2 is placed in the position indicated by the reference symbol B of FIG. 15, in the state where all the switchable coils are disconnected. A reference symbol 402 illustrates transmission characteristics when the electric power receiving device 2 is placed in the position indicated by the reference symbol B, in the state where the switchable coil 307 is connected and other switchable coils 303 and 309 are disconnected.

As illustrated by the reference symbol 400 in FIG. 16, when the electric power receiving device 2 is placed in the position indicated by the reference symbol A, no null point appears and comparatively favorable characteristics are obtained. On the other hand, as illustrated by the reference symbol 401, when the electric power receiving device 2 is placed in the position indicated by the reference symbol B, it is seen that a null point appears in the neighborhood of a frequency fx, and the transmission characteristic drops rapidly around the frequency fx. In this case, the switchable coil 307, which is arranged above the boundary area of the repeating coil 301 and the repeating coil 305, is connected. With the present configuration, as illustrated by the reference symbol 402, it is seen that the appearing position of the null point moves, resulting in the improved transmission characteristics.

Figure 17:
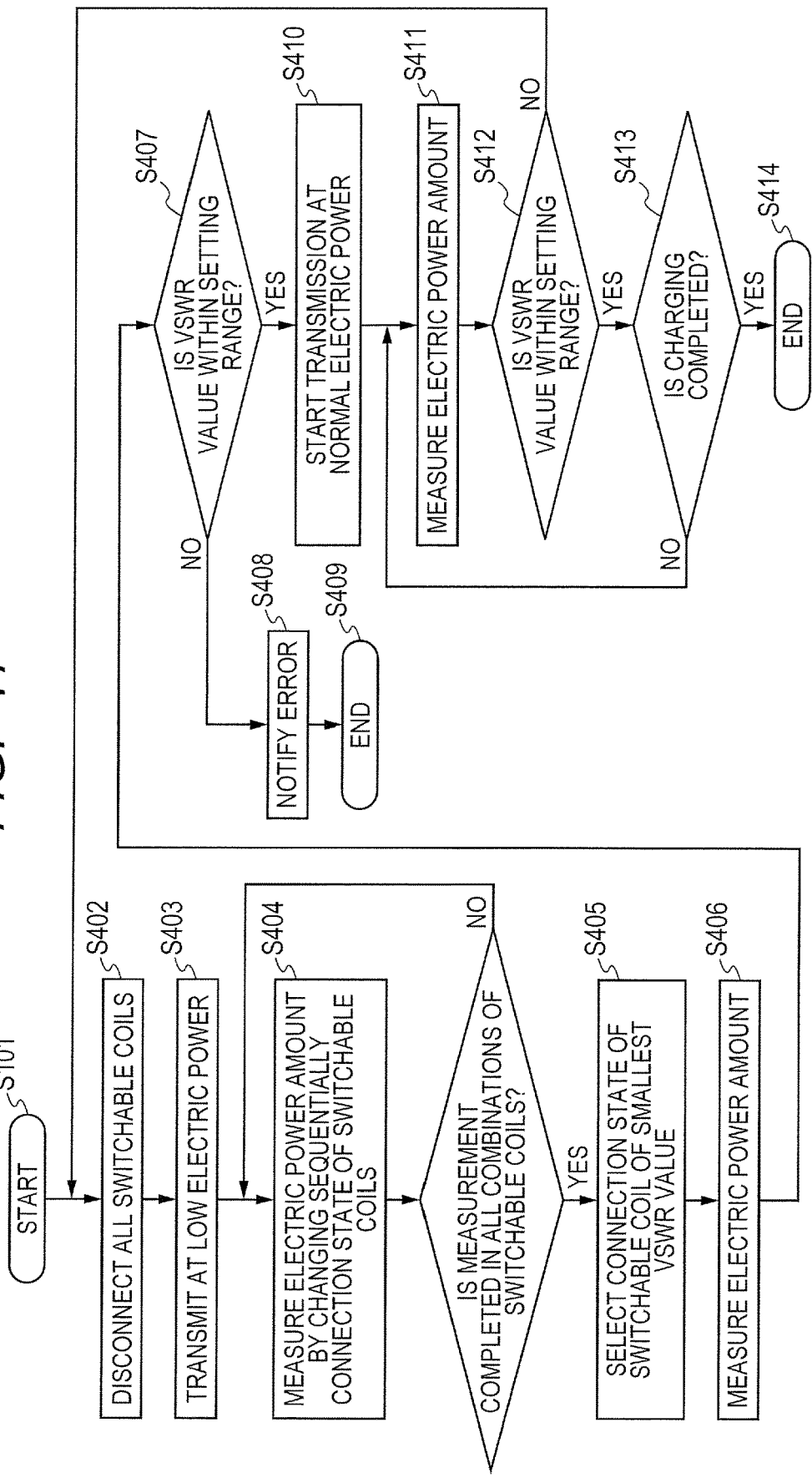
FIG. 17 is a flow chart illustrating an example of a flow of the transmission control in the non-contact power supply system according to Embodiment 6.

Next, the flow of processing of the transmission control in the non-contact power supply system 9 is explained in detail, with reference to FIG. 17.

FIG. 17 is a flow chart illustrating an example of a flow of the transmission control in the non-contact power supply system 9 according to Embodiment 6.

For example, when the power of the electric power transmitting device 8 is switched on and the electric power transmitting device 8 becomes ready to operate, processing related to the transmission control starts (S101). First, the control unit 103 in the electric power transmitting device 8 sets to "OFF" all the change-over switches 304, 308, and 310, to disconnect all the switchable coils 303, 307, and 309 (S402).

Next, the electric power transmitting device 8 starts the electric power transmission with electric power lower than normal (S403). Specifically, the control unit 103 changes the amplification factor of the transmitting amplifier 102 so that the electric power amount is set lower than the electric power amount of the normal transmission. The electric power transmitting device 8 transmits the electric power lower than normal, and concurrently calculates a VSWR by changing sequentially the connection state of the switchable coils 303, 307, and 309 (S404). Specifically, the control unit 103 switches "ON" and "OFF" of the change-over switches 304, 308, and 310, to change sequentially the connection state of the switchable coils 303, 307, and 309. For example, first, a VSWR is calculated for the case where all the switchable coils 303, 307, and 309 are disconnected, next, a VSWR is calculated for the case where only the switchable coil 303 is connected, next, a VSWR is calculated for the case where only the switchable coil 307 is connected, and so on. In this way, VSWRs are calculated sequentially for the case where a switchable coil to be connected is changed sequentially.

When the VSWR of all the combination is calculated, the control unit 103 selects the combination of the connection state of the switchable coils 303, 307, and 309 with the smallest value among the calculated VSWRs (S405). Then, the control unit 103 sets up "ON" and "OFF" of the change-over switches 304, 308, and 310 so as to meet the selected connection state, and calculates the VSWR at the time. The control unit 103 determines whether the calculated VSWR has a value within the prescribed range set up in advance (S407). The determining method in the present step is the same as that of Step S106 of FIG. 4 described above.

In Step S407, when the VSWR has a value outside the prescribed range, the control unit 103 in the electric power transmitting device 8 determines that the foreign substance has entered into the power transmission area, and notifies the error information externally (S408). After the notice of the error information, the electric power transmitting device 8 stops the electric power transmission and terminates the electric power transmitting (S409). On the other hand, when the value of VSWR is within the prescribed range, the control unit 103 determines that the electric power receiving device 2 has been placed in the power transmission area of the electric power transmitting device 8, and the electric power transmitting device 8 starts the electric power transmission with the normal electric power (S410). Specifically, the control unit 103 changes the amplification factor of the transmitting amplifier 102 so that the electric power amount is larger than the electric power amount set up in Step 403.

While the electric power transmission is performed with the normal electric power, the control unit 103 in the electric power transmitting device 8 calculates the voltage standing wave ratio VSWR suitably (S411). The control unit 103 determines whether the value of the calculated VSWR is within the prescribed range set up in advance, similarly to Step S407 (S412). In Step S412, when the value of the VSWR is outside the prescribed range, the control unit 103 determines that the electric power receiving device 2 has moved and resumes the processing for searching for the optimal connection state of the switchable coils (S402-S411). On the other hand, in Step S412, when the value of the VSWR is within the prescribed range, the electric power transmitting device 8 continues the electric power transmission until the electric power supply to the electric power receiving device 2 becomes unnecessary (S413). Subsequently, when the electric power transmission to the electric power receiving device 2 has become unnecessary due to the completion of electric charging to the battery VAT in the electric power receiving device 2 or due to other reasons, the electric power transmitting device stops the electric power transmission, and terminates the transmission control (S414).

As described above, according to the electric power transmitting device according to Embodiment 6, by switching the connection state (connected or disconnected) of both ends of the switchable coil, it is possible to change the electromagnetic field condition in the boundary area between the coils and to shift the position of a null point appearing in the boundary area. With the present configuration, even if an electric power receiving device is placed in the boundary area between the coils, it becomes possible to transmit sufficient electric power to the electric power receiving device, leading to the improvement of the transmission efficiency of electric power.

As described above, the invention accomplished by the present inventors has been concretely explained based on the embodiments. However, it cannot be overemphasized that the present invention is not restricted to the embodiments, and it can be changed variously in the range which does not deviate from the gist.

For example, in Embodiment 1 through Embodiment 5, the number of turns of the switchable coil is assumed to be one turn; however, the number of turns is not restricted to this and may be changed depending on the adjustable width of the resonance frequency, for example. Similarly, it is also possible to change variously the number of turns of the switchable coils 303, 307, and 309 in Embodiment 6, depending on the shift amount of a null point.

It has been illustrated that the electric power transmitting device 5 according to Embodiment 5 is provided with two switchable coils 114 and 115; however, the number of the switchable coils may be increased. For example, as in the electric power transmitting device 4 according to Embodiment 2, it is also preferable to provide four switchable coils and to employ one of them as a communications antenna for the wireless communications.

It has been illustrated that the electric power transmitting device 8 according to Embodiment 6 is provided with two repeating circuits 401 and 402. However, the number of the repeating circuits arranged side by side is not restricted in particular. FIG. 15 illustrates the case where the repeating circuits are arranged in a line to the right of the resonance circuit 110 as the origin in the figure. However, it is also preferable to arrange the repeating circuits in a line to the left of the resonance circuit 110 as the origin in the figure. FIG. 15 also illustrates the case where three sets of a switchable coil and a change-over switch are arranged. However, what is necessary is just to provide the set corresponding to the repeating circuit, and there is no restriction in particular in the number. FIG. 15 further illustrates the case where one switchable coil is arranged to one boundary area between coils. However, there is no restriction in particular in the number of the switchable coils arranged in the boundary area. It is preferable to arrange two switchable coils side by side in the boundary area in the Y direction, for example.

What is claimed is:

1. An electric power transmitting device comprising:
    a resonance circuit including a resonance capacity and a resonance coil acting as a transmitting antenna;
    a first repeating circuit including a first capacitor and a first repeating coil arranged magnetically coupled with the resonance coil; and
    a first coil arranged magnetically coupled with both the resonance coil and the repeating coil,
    wherein the electric power transmitting device transmits electric power in a non-contact manner with the use of resonant coupling between the resonance circuit and the first repeating circuit,
    wherein the resonance coil and the first repeating coil are arranged in the same plane, and
    wherein the first coil is arranged so as to overlap a boundary between the resonance coil and the first repeating coil in the height direction, and connection or disconnection of both ends of the first coil is switchable.

2. The electric power transmitting device according to claim 1 further comprising:
    a second repeating circuit including a second capacitor and a second repeating coil arranged magnetically coupled with the first repeating coil; and
    a second coil arranged magnetically coupled with both the first repeating coil and the second repeating coil,
    wherein the first repeating coil and the second repeating coil are arranged in the same plane, and
    wherein the second coil is arranged so as to overlap a boundary between the first repeating coil and the second repeating coil in the height direction, and connection or disconnection of both ends of the second coil is switchable.

3. The electric power transmitting device according to claim 2, further comprising:
    a power supply unit operable to generate an AC signal corresponding to the electric power to be transmitted and operable to supply it to the resonance circuit;
    a power sensing unit operable to detect a reflected amount of the AC signal supplied to the resonance circuit from the power supply unit; and
    a control unit,
    wherein the control unit switches between connection and disconnection of both ends of the first coil and both ends of the second coil, respectively, so as to minimize the reflected amount.

* * * * *